US010093332B2

(12) United States Patent
Kamei et al.

(10) Patent No.: US 10,093,332 B2
(45) Date of Patent: Oct. 9, 2018

(54) DEVICE FOR CREATING CONSTRUCTION GAUGE MEASUREMENT DIAGRAM, DEVICE FOR CREATING CONSTRUCTION GAUGE MEASUREMENT DIAGRAM DATA, AND METHOD FOR CREATING CONSTRUCTION GAUGE MEASUREMENT DIAGRAM

(71) Applicant: MITSUBISHI ELECTRIC CORPORATION, Chiyoda-ku (JP)

(72) Inventors: Katsuyuki Kamei, Tokyo (JP); Masashi Watanabe, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 59 days.

(21) Appl. No.: 15/309,561

(22) PCT Filed: Jun. 25, 2014

(86) PCT No.: PCT/JP2014/066848

§ 371 (c)(1),
(2) Date: Nov. 8, 2016

(87) PCT Pub. No.: WO2015/198423

PCT Pub. Date: Dec. 30, 2015

(65) Prior Publication Data

US 2017/0144682 A1 May 25, 2017

(51) Int. Cl.
*G09G 5/00* (2006.01)
*B61L 99/00* (2006.01)
(Continued)

(52) U.S. Cl.
CPC ............... *B61L 99/00* (2013.01); *B61L 23/04* (2013.01); *B61L 23/041* (2013.01); (Continued)

(58) Field of Classification Search
None
See application file for complete search history.

(56) References Cited

U.S. PATENT DOCUMENTS 5,410,346 A * 4/1995 Saneyoshi ................. B60R 1/00 348/116
5,519,618 A * 5/1996 Kastner ................... G01S 13/91 701/120

(Continued)

FOREIGN PATENT DOCUMENTS

| | | | |
|---|---|---|---|
| CN | 102673609 | A | 9/2012 |
| JP | 05-191902 | A | 7/1993 |
| JP | 2004-352107 | A | 12/2004 |
| JP | 2005-271717 | A | 10/2005 |
| JP | 2006-258448 | A | 9/2006 |
| JP | 102673609 | A | 9/2012 |

OTHER PUBLICATIONS

International Preliminary Report on Patentability and Written Opinion dated Jan. 5, 2017 in PCT/JP2014/066848 filed Jun. 25, 2014 with English translation.

(Continued)

*Primary Examiner* — Anh-Tuan V Nguyen
(74) *Attorney, Agent, or Firm* — Oblon, McClelland, Maier & Neustadt, L.L.P.

(57) ABSTRACT

Distance measurement means measures a distance from a measurement point to a construction gauge in a route of a track. A range identification unit identifies whether or not a measurement point falls within a predetermined range from the construction gauge based on the measured distance. A ground feature identification unit identifies whether or not the measurement point is a measurement point of a feature on a ground. Drawing means draws in a plan view a measurement point identified as a measurement point of a feature on the ground by the ground feature identification unit among the measurement points, and draws in side views a measurement point identified as not a measurement point of a feature on the ground. The drawing means performs
(Continued)

different drawing processes on a measurement point identified as falling within the predetermined range from the construction gauge among the measurement points and on a measurement point identified as not falling within the predetermined range from the construction gauge among the measurement points.

13 Claims, 33 Drawing Sheets

(51) Int. Cl.

| | |
|---|---|
| ***B61L 23/04*** | (2006.01) |
| ***G01B 11/00*** | (2006.01) |
| ***G01B 21/16*** | (2006.01) |
| ***G01B 21/20*** | (2006.01) |
| ***G06T 7/00*** | (2017.01) |
| ***G06T 11/60*** | (2006.01) |
| ***G06T 19/20*** | (2011.01) |
| ***B61L 25/02*** | (2006.01) |

(52) U.S. Cl.

CPC .......... *B61L 25/025* (2013.01); *G01B 11/002* (2013.01); *G01B 21/16* (2013.01); *G01B 21/20* (2013.01); *G06T 7/0006* (2013.01); *G06T 11/60* (2013.01); *G06T 19/20* (2013.01); *G06T 2207/10004* (2013.01); *G06T 2207/30108* (2013.01); *G06T 2210/04* (2013.01); *G06T 2215/16* (2013.01)

(56) References Cited

U.S. PATENT DOCUMENTS

| | | | | |
|---|---|---|---|---|
| 8,224,564 | B2 * | 7/2012 | Ogasawara ............ | G08G 1/165 701/301 |
| 2005/0110628 | A1 * | 5/2005 | Kernwein ............... | B61L 23/00 340/457 |
| 2010/0070172 | A1 * | 3/2010 | Kumar .................. | B61L 23/041 701/408 |
| 2012/0288154 | A1 * | 11/2012 | Shima .................... | G08G 1/167 382/103 |
| 2014/0365048 | A1 * | 12/2014 | Kubo .................. | B61L 27/0016 701/19 |
| 2014/0372037 | A1 * | 12/2014 | Kim ................... | B62D 15/0295 701/541 |
| 2015/0360686 | A1 * | 12/2015 | Kim ...................... | B60W 30/09 701/23 |

OTHER PUBLICATIONS

Search Report and Written Opinion dated Jan. 17, 2018 in Singaporean Patent Application No. 11201610484P, 10 pages.

International Search Report dated Sep. 30, 2014 in PCT/JP2014/066848 filed Jun. 25, 2014.

Suematsu et al, "Surface Evaluation in Cross-Section of Tunnel and Management thereof", Workshop at Seibu Reginal Chapter of Japan Society of Civil Engineers, No. IV-046, Mar. 2005, (with partial English translation), 3 pages.

* cited by examiner

| | |
|---|---|
| x COORDINATE VALUE OF $P_1$ | $x_1$ |
| y COORDINATE VALUE OF $P_1$ | $y_1$ |
| z COORDINATE VALUE OF $P_1$ | $z_1$ |
| x COORDINATE VALUE OF $P_2$ | $x_2$ |
| y COORDINATE VALUE OF $P_2$ | $y_2$ |
| z COORDINATE VALUE OF $P_2$ | $z_2$ |
| ⋮ | |
| x COORDINATE VALUE OF $P_K$ | $x_K$ |
| y COORDINATE VALUE OF $P_K$ | $y_K$ |
| z COORDINATE VALUE OF $P_K$ | $z_K$ |

7

| | |
|---|---|
| x COORDINATE VALUE OF $Q_1$ | $X_1$ |
| y COORDINATE VALUE OF $Q_1$ | $Y_1$ |
| z COORDINATE VALUE OF $Q_1$ | $Z_1$ |
| x COORDINATE VALUE OF $Q_2$ | $X_2$ |
| y COORDINATE VALUE OF $Q_2$ | $Y_2$ |
| z COORDINATE VALUE OF $Q_2$ | $Z_2$ |
| ⋮ | |
| x COORDINATE VALUE OF $Q_N$ | $X_N$ |
| y COORDINATE VALUE OF $Q_N$ | $Y_N$ |
| z COORDINATE VALUE OF $Q_N$ | $Z_N$ |

5

6

| | |
|---|---|
| u COORDINATE VALUE OF $R_1$ | $U_1$ |
| v COORDINATE VALUE OF $R_1$ | $V_1$ |
| u COORDINATE VALUE OF $R_2$ | $U_2$ |
| v COORDINATE VALUE OF $R_2$ | $V_2$ |
| ⋮ | |
| u COORDINATE VALUE OF $R_K$ | $U_M$ |
| v COORDINATE VALUE OF $R_M$ | $V_M$ |

F I G. 25
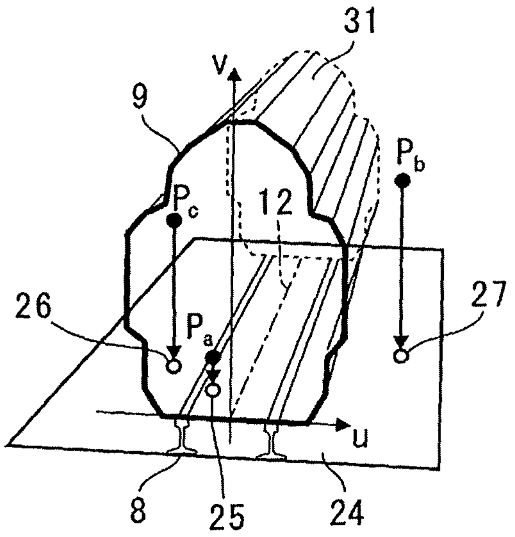
F I G. 26
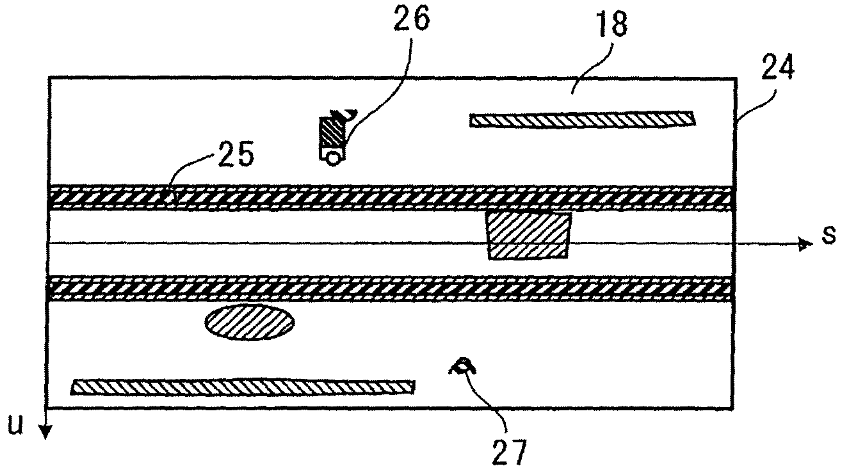

F I G. 2 9
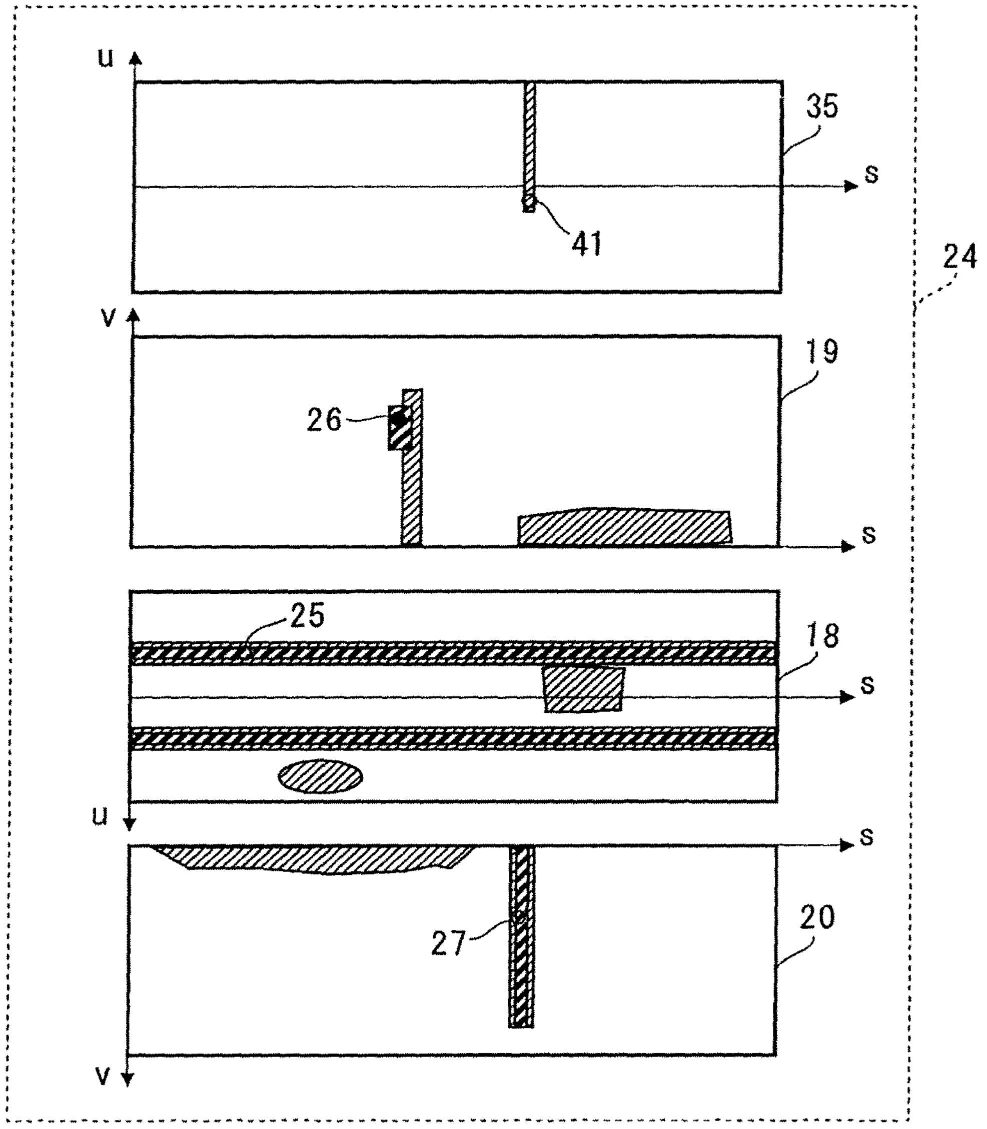

F I G. 35
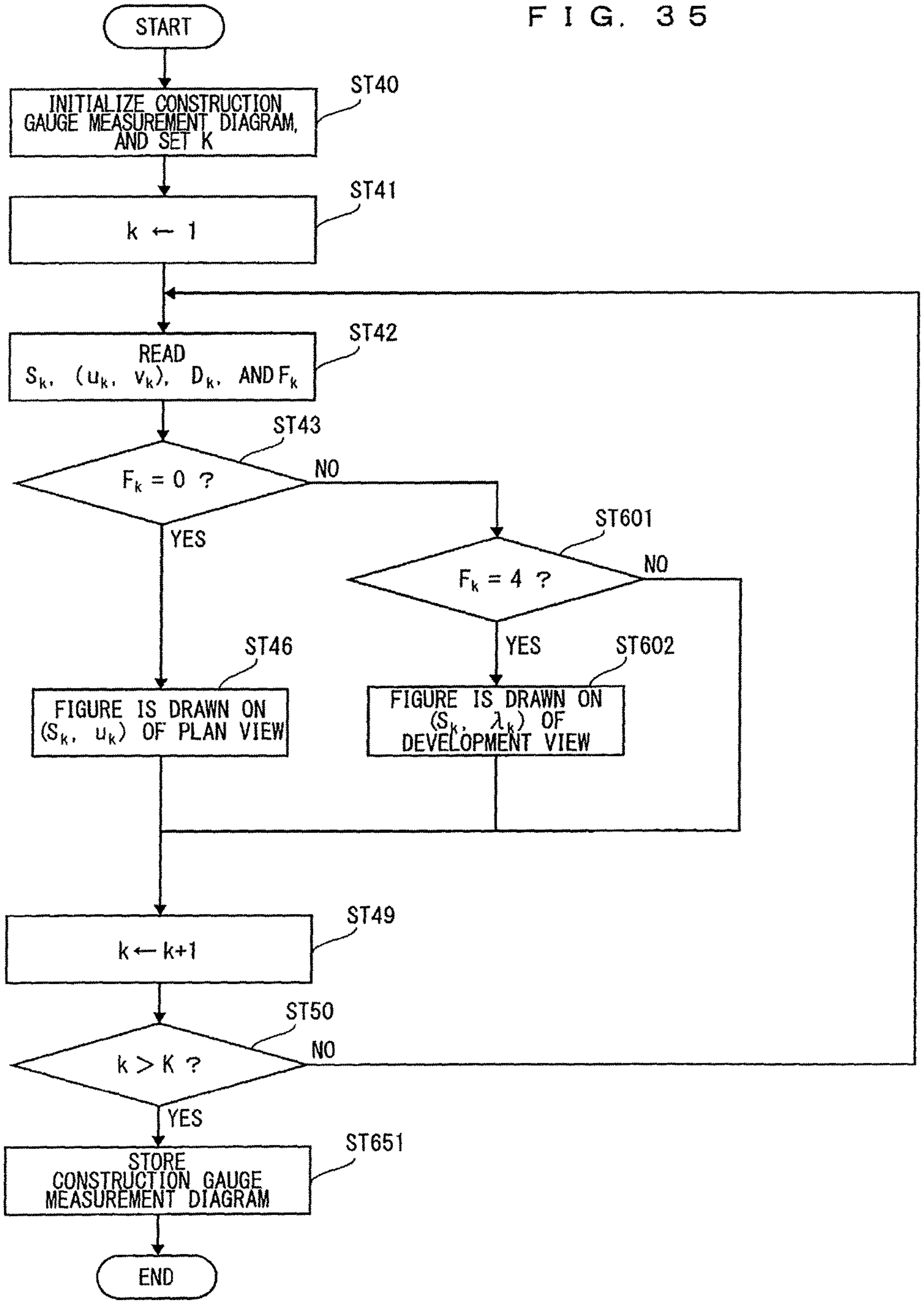

F I G. 3 6
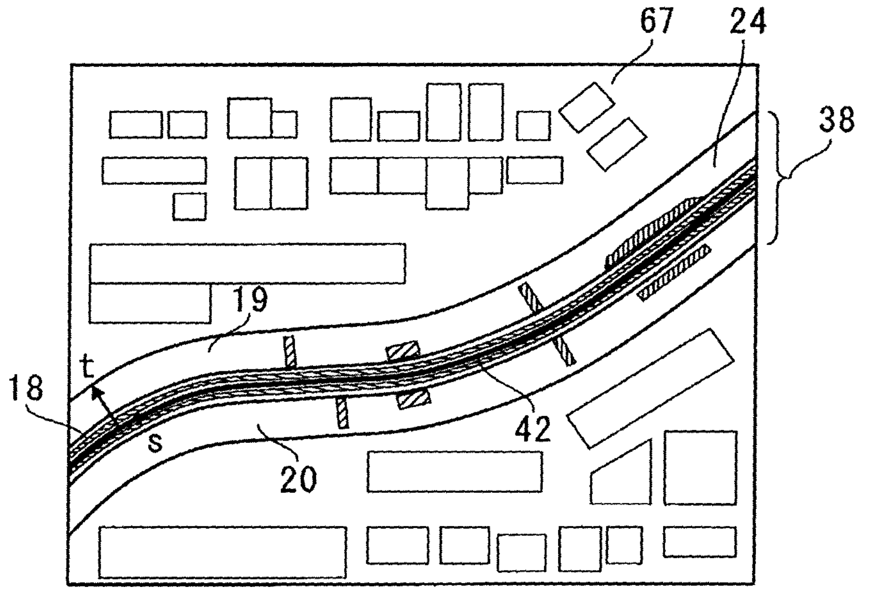

DEVICE FOR CREATING CONSTRUCTION GAUGE MEASUREMENT DIAGRAM, DEVICE FOR CREATING CONSTRUCTION GAUGE MEASUREMENT DIAGRAM DATA, AND METHOD FOR CREATING CONSTRUCTION GAUGE MEASUREMENT DIAGRAM

TECHNICAL FIELD

The present invention relates to a device for creating a construction gauge measurement diagram, a device for creating a construction gauge measurement diagram data, a method for creating a construction gauge measurement diagram, a construction gauge measurement diagram, and construction gauge measurement diagram data, and in particular, relates to a device for creating a construction gauge measurement diagram, a device for creating a construction gauge measurement diagram data, a method for creating a construction gauge measurement diagram, a construction gauge measurement diagram, and construction gauge measurement diagram data for easily grasping entry or approach of a structure to the construction gauge of a railway or a road.

BACKGROUND ART

For safe operation of railway trains and vehicles on a road, construction gauges beyond which a structure is not allowed to be installed are set with respect to the track or the road. In railway maintenance and inspection work, whether there is no structure within the construction gauge is checked and a distance to the structure approaching the construction gauge is measured. Specifically, position coordinates of the structure near the track are calculated by surveying by a laser scanner and the like or image measurement, and then, a distance from the construction gauge set over the track or a distance falling within the construction gauge is calculated. The obtained distance is represented in a table as a numeric value, and in addition to this, as methods of visual representation, there are a technique of plotting a shape of the construction gauge and a measurement point on the structure in a cross-sectional view of a cross section perpendicular to the track so as to represent (for example, Patent Document 1) and a technique of overlapping a reference region determined by the construction gauge with an object to be imaged within the construction gauge based on an image of a camera so as to display (for example, Patent Document 2).

PRIOR ART DOCUMENTS

Patent Documents

Patent Document 1: Japanese Patent Application Laid-Open No. 2005-271717

Patent Document 2: Japanese Patent Application Laid-Open No. 2004-352107

SUMMARY OF INVENTION

Problems to be Solved by the Invention

However, in the display of the construction gauge and the measurement point disclosed in Patent Document 1 described above, only the measurement results only on one cross section over the track are shown. For this reason, there have been problems that an enormous number of cross-sectional views are created for each cross section at a slight distance if the measurement results over a wide range such as the entire track are to be checked, and that all the cross-sectional views have to be viewed. In addition, there has been a problem that an enormous amount of space is required so as to present the measurement results in document.

In addition, in the display of the object to be imaged falling within the construction gauge disclosed in Patent Document 2 described above, the reference region and the object to be imaged falling within the reference region are drawn in the image with respect to the reference region set by the measurement area within the camera's field of view and the construction gauge. For this reason, there has been a problem that the image has to be reproduced from the start point of the track and the image has to be viewed to the end point if the measurement results over a wide range such as the entire track are to be checked. In addition, in the same way, there has been a problem that an image has to be printed for each position at a slight distance and that an enormous amount of space is required so as to present the measurement results in document.

The present invention has been made to solve the problems as described above, and an object thereof is to obtain a device for creating a construction gauge measurement diagram, a device for creating construction gauge measurement diagram data, a method for creating a construction gauge measurement diagram, a construction gauge measurement diagram, and construction gauge measurement diagram data for easily checking whether or not there is a structure approaching or entering the construction gauge over a wide range of the track.

Means for Solving the Problems

A device for creating a construction gauge measurement diagram according to one aspect of the present invention includes storage means, distance measurement means, identification means, and drawing means. The storage means stores a route of at least one track, a shape of a construction gauge, and coordinates of a plurality of measurement points. The distance measurement means measures a distance from each of the measurement points to the construction gauge in the route of the track. The identification means identifies each of attributes of the measurement points. The identification means includes a range identification unit, and a ground feature identification unit. The range identification unit identifies whether or not each of the measurement points falls within a predetermined range from the construction gauge based on a distance measured by the distance measurement device. The ground feature identification unit identifies whether or not each of measurement points at least identified by the range identification unit as falling within the predetermined range from the construction gauge is a feature on a ground among the measurement points. The drawing means draws in a plan view a measurement point identified as a measurement point of a feature on the ground by the ground feature identification unit among the measurement points, and draws in at least one side view at least part of measurement points identified as not a measurement point of a feature on the ground. The drawing means performs different drawing processes on a measurement point identified as falling within the predetermined range from the construction gauge by the range identification unit among the measurement points and a measurement point identified as not falling within the predetermined range from the construction gauge by the range identification unit among the measurement points.

A device for creating a construction gauge measurement diagram according to another aspect of the present invention includes storage means, distance measurement means, identification means, and drawing means. The storage means stores a route of at least one track, a shape of a construction gauge, and coordinates of a plurality of measurement points. The distance measurement means measures a distance from each of the measurement points to the construction gauge in the route of the track. The identification means identifies each of attributes of the measurement points. The identification means includes a range identification unit and a ground feature identification unit. The range identification unit identifies whether or not each of the measurement points falls within a predetermined range from the construction gauge based on a distance measured by the distance measurement device. The ground feature identification unit identifies whether or not each of measurement points at least identified by the range identification unit as falling within the predetermined range from the construction gauge is a feature on a ground among the measurement points. The drawing means draws the measurement points in a plan view. The drawing means performs different drawing processes on a measurement point identified as falling within the predetermined range from the construction gauge by the range identification unit among the measurement points and a measurement point identified as not falling within the predetermined range from the construction gauge by the range identification unit among the measurement points. The drawing means draws, by using different symbols, a measurement point identified as a measurement point of a feature on the ground by the ground feature identification unit among the measurement points, and a measurement point identified as not a measurement point of a feature on the ground by the ground feature identification unit among the measurement points.

A device for creating a construction gauge measurement diagram according to still another aspect of the present invention includes storage means, distance measurement means, identification means, and drawing means. The storage means stores a route of at least one track passing through a tunnel, a shape of a construction gauge, coordinates of a plurality of measurement points, and a cross-sectional shape of the tunnel. The distance measurement means measures the distance from each of the measurement points to the construction gauge in the route of the track. The identification means identifies each of attributes of the measurement points. The identification means includes a range identification unit and a ground feature identification unit. The range identification unit identifies whether or not each of the measurement points falls within a predetermined range from the construction gauge based on a distance measured by the distance measurement means. The ground feature identification unit identifies whether or not each of measurement points at least identified by the range identification unit as falling within the predetermined range from the construction gauge is a measurement point of a feature on the ground among the measurement points. The drawing means draws the measurement points. The drawing means draws in the plan view a measurement point identified as a measurement point of a feature on the ground by the ground feature identification unit among the measurement points, and draw in a development view a measurement point identified as not a measurement point of a feature on the ground. The drawing means performs different drawing processes on a measurement point identified as falling within the predetermined range from the construction gauge by the range identification unit among the measurement points and a measurement point identified as not falling within the predetermined range from the construction gauge by the range identification unit among the measurement points.

A device for creating construction gauge measurement diagram data of the present invention includes storage means, distance measurement means, identification means, and data creation means. The storage means stores a route of at least one track, a shape of a construction gauge, and coordinates of a plurality of measurement points. The distance measurement means measures a distance from each of the measurement points to the construction gauge in the route of the track. The identification means identifies each of attributes of the measurement points. The identification means includes a range identification unit and a ground feature identification unit. The range identification unit identifies whether or not each of the measurement points falls within a predetermined range from the construction gauge based on a distance measured by the distance measurement means. The ground feature identification unit identifies whether or not each of measurement points at least identified by the range identification unit as falling within the predetermined range from the construction gauge is a measurement point of a feature on the ground among the measurement points. The data creation means creates plan view data including coordinate values for drawing in a plan view a measurement point identified as a measurement point of the feature on the ground by the ground feature identification unit among the measurement points, and the side view data including the coordinate values for drawing in at least one side view at least part of the measurement points identified as not the measurement point of the feature on the ground.

A method for creating a construction gauge measurement diagram according to one aspect of the present invention is based on a route of at least one track, a shape of the construction gauge, and coordinates of a plurality of measurement points, and the method includes the following steps. The distance from each of the measurement points to the construction gauge in the route of the track is measured. Each of the attributes of the measurement points is identified. The step of identifying the attributes includes a step of identifying whether or not each of the measurement points falls within a predetermined range from the construction gauge based on the measured distance, and a step of identifying by the range identification unit whether or not each of measurement points at least identified as falling within a predetermined range from the construction gauge is a measurement point of a feature on a ground among the measurement points. A measurement point identified as a measurement point of a feature on the ground among the measurement points is drawn in a plan view, and at least part of the measurement points identified as not a measurement point of a feature on the ground are drawn in at least one side view. Different drawing processes are performed on a measurement point identified as falling within the predetermined range from the construction gauge among the measurement points and on a measurement point identified as not falling within the predetermined range from the construction gauge among the measurement points.

A method for creating a construction gauge measurement diagram according to another aspect of the present invention is based on a route of at least one track, a shape of the construction gauge, and coordinates of a plurality of measurement points, and the method includes the following steps. The distance from each of the measurement points to the construction gauge in the route of the track is measured. Each of the attributes of the measurement points is identified. The step of identifying the attributes includes a step of identifying whether or not each of the measurement points falls within a predetermined range from the construction gauge based on the measured distance, and a step of identifying whether or not each of the measurement points at least identified as falling within the predetermined range from the construction gauge is a measurement point of a feature on a ground among the measurement points. In terms of a measurement point identified as falling within the predetermined range from the construction gauge among the measurement points, plan view data including coordinate values for drawing in a plan view a measurement point identified as a measurement point of a feature on the ground among the measurement points, and side view data including coordinate values for drawing in at least one side view at least part of measurement points identified as not a measurement point of a feature on the ground are created.

A construction gauge measurement diagram according to one aspect of the present invention is obtained by drawing a plurality of measurement points falling within a predetermined range from the construction gauge. The construction gauge measurement diagram includes a side view and a plan view. One part of the measurement points are drawn in the side view. Another part of the measurement points which are of features on the ground are drawn in the plan view.

A construction gauge measurement diagram according to another aspect of the present invention is obtained by drawing a plurality of measurement points falling within a predetermined range from the construction gauge, and the plurality of measurement points include a measurement point of a feature on the ground and a measurement point that is not a measurement point of a feature on the ground. The construction gauge measurement diagram includes a drawing of a symbol representing a measurement point of a feature on the ground among the plurality of measurement points, and a drawing of a symbol representing a measurement point not of a feature on the ground among the plurality of measurement points. The symbol representing the feature on the ground among the plurality of measurement points and the symbol representing the measurement point not of the feature on the ground among the plurality of measurement points are different from each other.

Construction gauge measurement diagram data of the present invention includes data of coordinate values for drawing each of a plurality of measurement points falling within a predetermined range from a construction gauge, and data corresponding to a distance from each of the measurement points to the construction gauge.

Effects of the Invention

According to the present invention, there can be obtained the construction gauge measurement diagram capable of condensedly displaying the measurement point while maintaining particularly useful information for identifying on-site the position of the feature corresponding to the measurement point entering or approaching the construction gauge.

The objects, features, aspects, and advantages of the present invention will be more apparent by the following detailed description and the accompanying drawings.

BRIEF DESCRIPTION OF DRAWINGS

FIG. 25 is an explanatory diagram illustrating operation of a drawing device included in a device for creating a construction gauge measurement diagram according to a fourth embodiment of the present invention.

FIG. 26 is an explanatory diagram illustrating a configuration of the construction gauge measurement diagram according to the fourth embodiment of the present invention.

FIG. 29 is an explanatory diagram illustrating a configuration of a construction gauge measurement diagram according to the fifth embodiment of the present invention.

FIG. 35 is a flowchart illustrating operation of a drawing device in the method for creating a construction gauge measurement diagram according to the sixth embodiment of the present invention.

FIG. 36 is an explanatory diagram illustrating a configuration of a construction gauge measurement diagram according to a seventh embodiment of the present invention.

DESCRIPTION OF EMBODIMENTS

Figure 1:
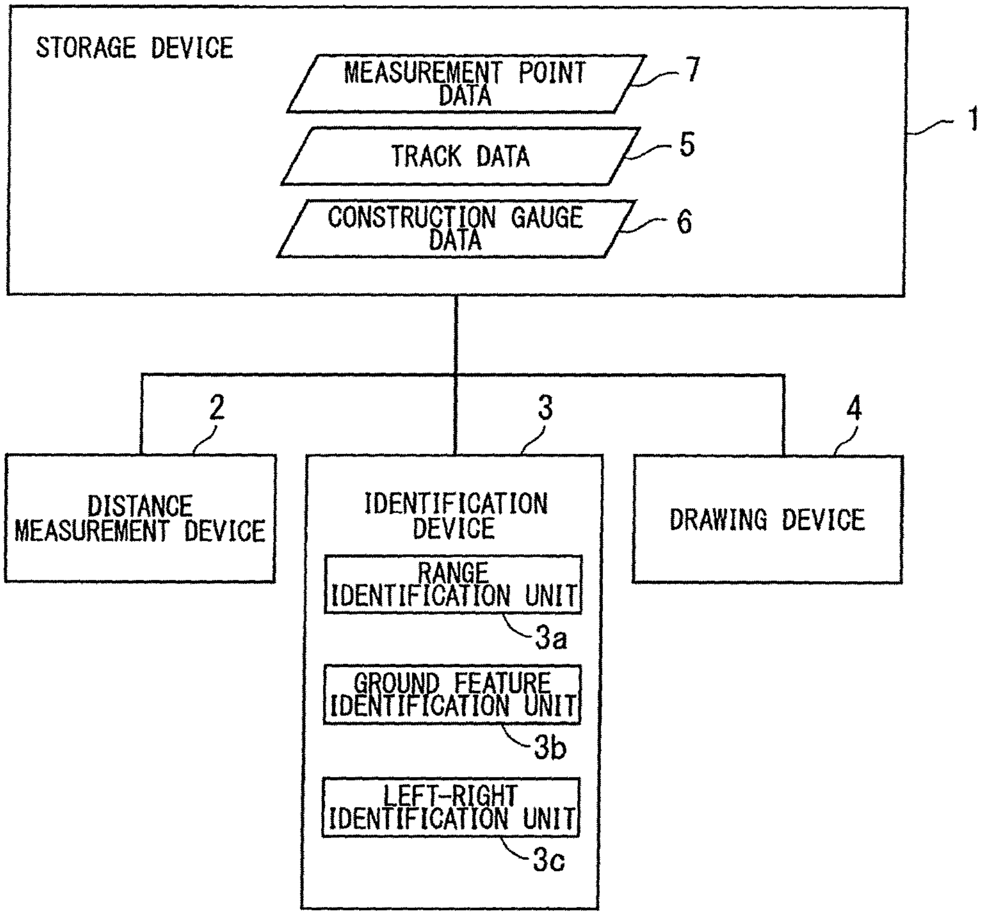
FIG. 1 is a block diagram illustrating a configuration of a device for creating a construction gauge measurement diagram according to a first embodiment of the present invention.

In the following, embodiments of the present invention will be described with reference to the drawings. It should be noted that in the following drawings, the same or corresponding portions will be denoted by the same reference numerals, and the descriptions thereof will not be repeated.

<First Embodiment>

Summary of Device for Creating Construction Gauge Measurement Diagram

FIG. 1 is a block diagram illustrating a device for creating a construction gauge measurement diagram according to the present embodiment. The creating device includes a storage device 1 (storage means), a distance measurement device 2 (distance measurement means), an identification device 3 (identification means), and a drawing device 4 (drawing means).

The storage device 1 can store information representing a route of a track, a shape of a construction gauge, and coordinates of a plurality of measurement points. These pieces of information may be input from an input unit (not shown) of the creating device. Although in the following, these data will be described as being already stored in the storage device 1, it is sufficient that these data are stored when the device is used.

The distance measurement device 2 measures the distance from each of the measurement points to the construction gauge in the route of the track. Specifically, the distance measurement device 2 obtains the nearest point from the measurement point to the construction gauge by using the information stored in the storage device 1, and measures the distance from the measurement point to the nearest point. It should be noted that the "measurement" by the distance measurement device 2 may be paraphrased as "calculation", and rather than the on-site work where the measurement points exist, the "measurement" is associated with the operation of the information previously obtained by the work.

The identification device 3 includes a range identification unit 3*a*, a ground feature identification unit 3*b*, and a left-right identification unit 3*c* so as to identify the attributes of each measurement point. The range identification unit 3*a* identifies whether or not each measurement point falls within a predetermined range from the construction gauge based on the distance measured by the distance measurement device 2. The ground feature identification unit 3*b* identifies whether or not each of the measurement points at least identified by the range identification unit 3*a* as falling within the predetermined range from the construction gauge is a feature on the ground among the measurement points. In this way, the identification device 3 identifies whether the measurement point falls within the predetermined range from the construction gauge, in other words, whether each measurement point approaches or enters the construction gauge depending on the above-mentioned distance, and identifies whether the measurement point is a feature on the ground. In addition, in the present embodiment, regarding at least part of the measurement points, the left-right identification unit 3*c* of the identification device 3 identifies whether they are located on one of the left and right sides of the track.

The drawing device 4 draws at least part of the measurement points. Specifically, the drawing device 4 draws in the plan view the measurement points identified as the features on the ground by the ground feature identification unit 3*b* among the measurement points. In addition, the drawing device 4 draws at least part of the measurement points identified not to be features on the ground by the ground feature identification unit 3*b* among the measurement points in at least one of the side views. In the present embodiment, the drawing device 4 draws the measurement points identified not to be features on the ground by the ground feature identification unit 3*b* among the measurement points in one of the left side view and the right side view depending on the identification result of the left-right identification unit 3*c*. The drawing device 4 performs different drawing processes on the measurement points identified as falling within the predetermined range from the construction gauge by the range identification unit 3*a* among the measurement points and the measurement points identified as not falling within the predetermined range from the construction gauge by the range identification unit 3*a* among the measurement points. The details of the drawing processes will be described below.

Figures 2, 3:
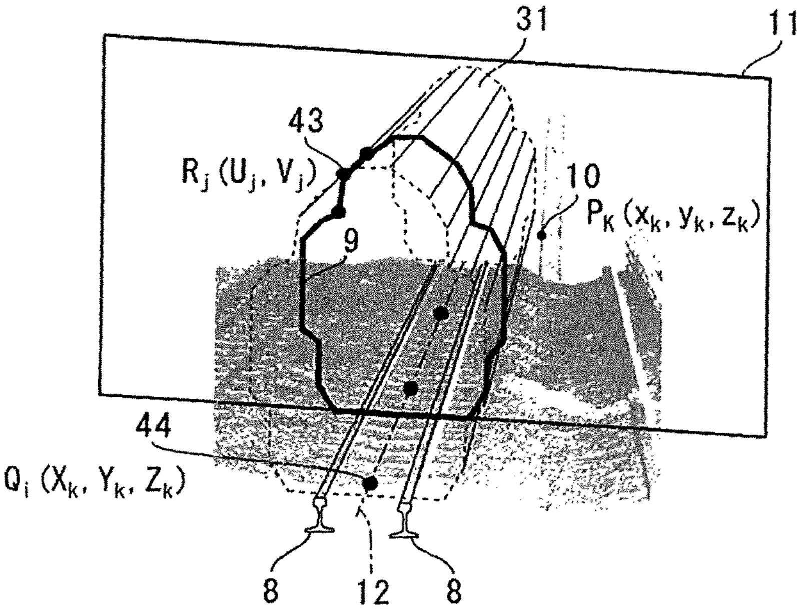
FIG. 2 is an explanatory diagram illustrating an example of a track, a construction gauge, and measurement points handled by the device for creating a construction gauge measurement diagram according to the first embodiment of the present invention.
FIG. 3 is an explanatory diagram illustrating measurement point data handled by the device for creating a construction gauge measurement diagram according to the first embodiment of the present invention.

FIG. 2 is an explanatory diagram illustrating an example of a track 12, a construction gauge 9, and a measurement point 10. Hereinafter, the track 12 will be described as referring to the path center between rails 8. The construction gauge 9 is set on a plane perpendicular to the track 12 at each point on the track 12, and a range 31 of the construction gauge is obtained by sweeping this along the track 12. The measurement point 10 is a point where three-dimensional coordinates of a feature such as a structure, a building, a tree, or a landform are measured. Identification as to whether the measurement point 10 approaches or enters the range 31 of the construction gauge is identified depending on the distance between the measurement point 10 and the construction gauge 9 in a plane 11 perpendicular to the track 12 and passing through the measurement point 10 and depending on whether or not the measurement point 10 is located within the construction gauge 9. Specifically, when the measurement point 10 is on the outside of the construction gauge 9, whether or not the measurement point 10 and the construction gauge 9 approach each other is identified depending on the distance between the measurement point 10 and the construction gauge 9.

The measurement point 10 has a three-dimensional coordinate value of (x, y, z). The number of measurement points 10 is set to be K, and the coordinates of the k-th measurement point $P_k$ is set to be ($x_k$, $y_k$, $z_k$). In FIG. 2, examples of the acquirable measurement points are shown as a background, in addition to one measurement point $P_k$. The x, y, and z may be, for example, a plane rectangular coordinate system, or may be, for example, a coordinate system taking x as eastward, y as northward, and z as vertically upward with an arbitrary point set as an origin. The coordinates may be set in units of meters, for example. Hereinafter, x, y, and z will be described as right-handed system, and the z-axis will be described as vertically upward. Measurement point data 7 of the measurement point 10 is, for example, stored in the storage device 1 in the form as shown in FIG. 3.

The measurement points 10 is, for example, measured by the mobile mapping system being a three-dimensional shape measurement system that acquires three-dimensional shape of the surrounding target space. The mobile mapping system acquires the coordinate values of the surrounding features as point cloud data. The mobile mapping system is mounted on a mobile body such as a vehicle. The mobile mapping system includes a positioning device such as a GPS (Global Positioning System) device, an inertial navigation device such as a gyroscope, and an odometer device for calculating the movement distance from the vehicle speed pulse, and includes a laser scanner. The displacement from the own vehicle to the object is measured by the laser scanner while the position and the posture of the own vehicle is accurately measured by the GPS and the inertial navigation system, whereby the three-dimensional coordinates of the location irradiated by the laser pulse are acquired. The laser scanner sequentially irradiates the location while rotating the irradiation direction of the laser pulses being the distance measurement direction in the rotation plane. A point cloud in one plane is obtained by the rotation of one period, and the vehicle further proceeds, whereby detailed point cloud data is acquired over the target space.

It should be noted that the measurement method of the measurement point is not limited to those by the mobile mapping system described above, and may be performed by using another measurement device, for example, a surveying device such as a stationary laser scanner or a total station, or by using the image measurement.

Figures 4, 5:
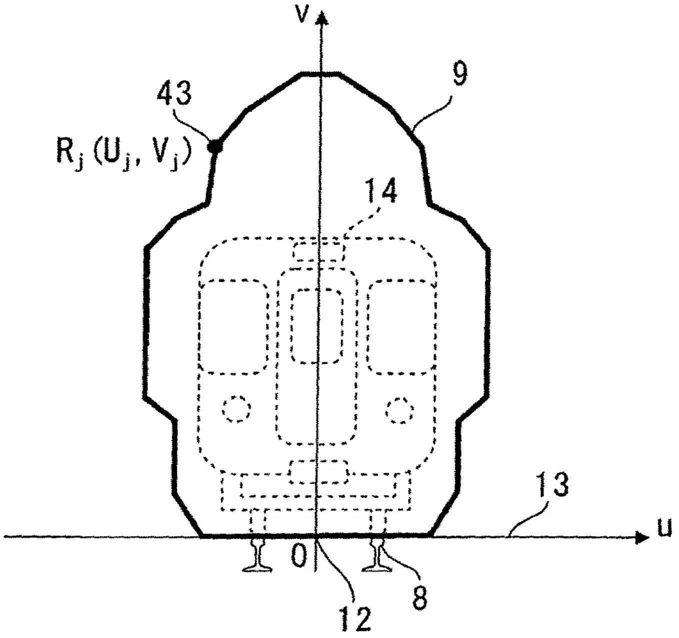
FIG. 4 is an explanatory diagram illustrating track data handled by the device for creating a construction gauge measurement diagram according to the first embodiment of the present invention.
FIG. 5 is an explanatory diagram illustrating a shape of the construction gauge handled by the device for creating a construction gauge measurement diagram according to the first embodiment of the present invention.

The track 12 is represented as a connection of the point sequence $Q_i$ ($X_i$, $Y_i$, $Z_i$) where i=1, 2, . . . , N of three-dimensional continuous points 44 on a path center. Track data 5 is stored in the storage device 1, for example, in the form as shown in FIG. 4.

The shape of the construction gauge 9 (FIG. 5) is defined in the plane 11 perpendicular to the track 12 (FIG. 2). Assuming that the track 12 (path center) is taken as the origin, a u-axis is taken along a rail surface 13 connecting the left and right rail top faces in a cross-sectional direction, and a v-axis is taken vertically upward, the shape of the construction gauge 9 is represented as a closed shape sequentially connecting the point sequence $R_j$ ($U_j$, $V_j$) (j=1, 2, . . . , M) of a vertex 43 with line segments. The construction gauge 9 is swept along the track 12, whereby the range 31 (FIG. 2) of the construction gauge over the track 12 is formed. The construction gauge 9 in the railway field is intended to provide a margin so that a traveling train 14 does not collide against the surrounding structure. Construction gauge data 6 is stored in the storage device 1, for example, in the form as shown in FIG. 6.

It should be noted that the uv plane perpendicular to the track 12 takes the u-axis rightward and the v-axis upward as seen in a direction of a mileage. That is, the direction of the mileage of the track 12 (outbound direction) is set as a reference in the setting of the coordinate axes. Hereinafter, the right side and the left side represent those in the case where the direction of the mileage is set as frontward.

(Function of Distance Measurement Device)

Figures 6, 7:
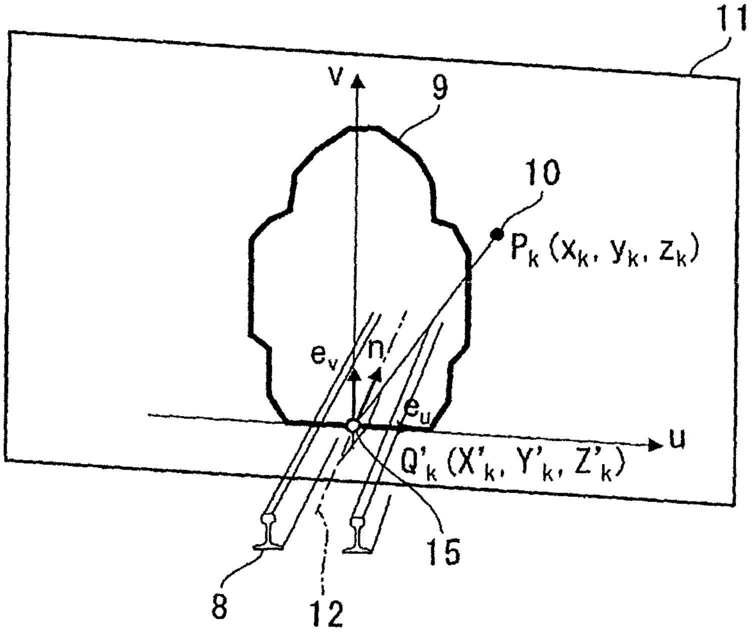
FIG. 6 is an explanatory diagram illustrating the construction gauge data representing the shape of the construction gauge handled by the device for creating a construction gauge measurement diagram according to the first embodiment of the present invention.
FIG. 7 is an explanatory diagram illustrating operation of a distance measurement device included in the device for creating a construction gauge measurement diagram according to the first embodiment of the present invention.

As shown in FIG. 7, the distance measurement device 2 included in the device for creating a construction gauge measurement diagram (FIG. 1) obtains (u, v) coordinates and calculates the distance to the construction gauge 9 for each measurement point 10. First, the plane 11 and the uv coordinate system for being compared with the construction gauge 9 are set for a measurement point 10. The plane 11 is a plane including a measurement point 10 and being perpendicular to the track 12. As a specific determination method of the plane 11, a track nearest point 15 giving the shortest distance from the measurement point 10 to the track 12 is obtained, and a plane passing through the track nearest point 15 and being perpendicular to the track 12 is obtained as the plane 11. The track nearest point 15 is obtained as a point giving the shortest distance to the measurement point $P_k$ in the continuous line segments connecting the point sequence $Q_i$. The normal vector n of the plane 11 is a vector for indicating the direction of the track 12 at the track nearest point 15 and, for example, can be obtained as $n=(X_{i+1}-X_i, Y_{i+1}-Y_i, Z_{i+1}-Z_i)$ when the track nearest point 15 is located between the $Q_i$ $(X_i, Y_i, Z_i)$ and $Q_{i+1}$ $(X_{i+1}, Y_{i+1}, Z_{i+1})$.

Subsequently, the coordinates $(x_k, y_k, z_k)$ of the measurement point $P_k$ is converted to the coordinates of the uv coordinate system where the track (path center) 12 is taken as the origin in the plane 11. First, the unit vector $e_u$ in the u-axis direction is calculated. The unit vector $e_u$ is a vector having the same direction as the direction of the vector product of the normal vector n and the vertical upward vector, and having the size of 1. That is, $e_u=n\times(0, 0, 1)/\{|n\times(0, 0, 1)|\}$. The unit vector $e_v$ in the v-axis direction is a vector having the same direction as the direction of the vector product of the unit vector $e_u$ and the normal vector n, and having the size of 1. That is, $e_v=e_u\times n/\{|e_u\times n|\}$.

As a result, if the track nearest point 15 with respect to the measurement point $P_k$ is represented as $Q'_k$ $(X'_k, Y'_k, Z'_k)$, the coordinates $(u_k, v_k)$ of the measurement point $P_k$ in the uv coordinate system are obtained as $u_k=(x_k-X'_k, y_k-Y'_k, z_k-Z'_k)\cdot e_u$, and $v_k=(x_k-X'_k, y_k-Y'_k, z_k-Z'_k)\cdot e_v$.

In addition, the mileage of the track nearest point 15 is set as a mileage $S_k$ of the measurement point $P_k$. This is the length from the start point along the track 12 of the track nearest point 15. The value may be obtained by the integration of the distance from the start point of the track 12, for example, $Q_i$, or may be obtained by the interpolation from the points at the front and rear of the track nearest point 15 when the mileage is previously defined in the point $Q_i$.

Figure 8:
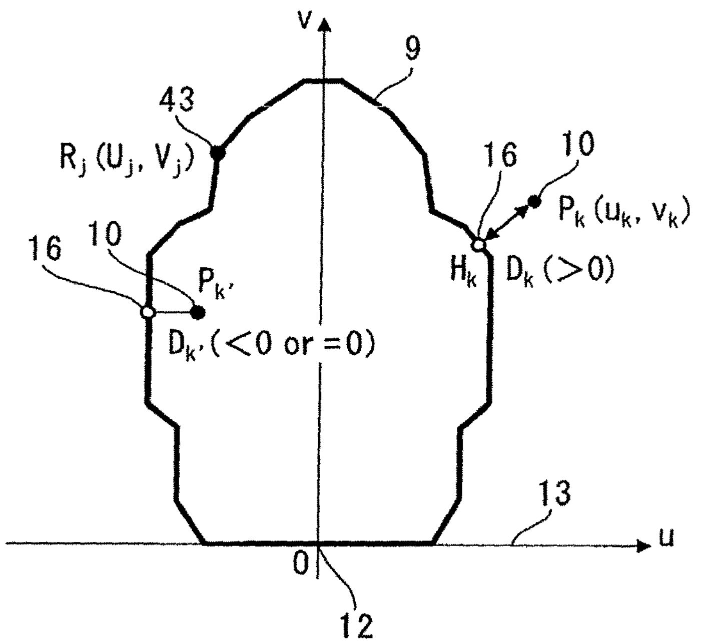
FIG. 8 is an explanatory diagram illustrating the operation of a distance measurement device included in the device for creating a construction gauge measurement diagram according to the first embodiment of the present invention.

Subsequently, as shown in FIG. 8, the distance between the measurement point 10 and the construction gauge 9 is calculated in the uv coordinate system. Specifically, a nearest point 16, which gives the shortest distance to the measurement point 10, of the construction gauge 9 is obtained, and the distance D from the measurement point 10 to the nearest point 16 is obtained. The distance for the measurement point $P_k$ is set as the distance $D_k$ of the measurement point $P_k$ to the construction gauge 9. However, here, when the measurement point 10 enters the inside of the construction gauge 9 as in the measurement point $P_{k'}$ shown in FIG. 8, the distance $D_{k'}$ is set as 0, or the sign is represented as negative.

(Function of Identification Device)

The identification device 3 (FIG. 1) performs the identification on each measurement point 10 by using the distance D from the measurement point 10 to the construction gauge 9 and using the nearest point 16 described above.

The range identification unit 3a identifies whether or not each measurement point 10 has entered or approached the construction gauge 9. Specifically, the measurement point $P_k$ is identified to be located in the construction gauge 9 when the distance $D_k$ of the measurement point $P_k$ is 0 or negative. That is, the measurement point $P_k$ is identified to have entered the construction gauge 9. When the distance $D_k$ is positive, if the distance $D_k$ is a predetermined value $D_0$ or less, the range identification unit 3a identifies that the measurement point $P_k$ approaches the construction gauge 9. The value $D_0$ may be set for the management of the track 12, and is, for example, about 0.1 m. When the distance $D_k$ exceeds the value $D_0$, the range identification unit 3a identifies that the measurement point $P_k$ neither enters nor approaches the construction gauge 9. In other words, the range identification unit 3a identifies that the measurement point $P_k$ is not within the predetermined range, maintains a sufficient distance from the construction gauge 9, and therefore does not affect the train traveling.

The ground feature identification unit 3b identifies whether the measurement point entering or approaching the construction gauge 9 among the measurement points 10 is a measurement point where the feature on the ground is measured, or is an other measurement point. This other measurement point is typically that of the feature located along the track 12. This identification is for determining which of the plan view or the side view the measurement point approaching or entering the construction gauge 9 is to be drawn on. The plan view is considered to represent the state where the feature on the ground approaches or enters the base part of the construction gauge 9, and the side view is considered to represent the state where the feature along the track 12 approaches or enters the side part of the construction gauge 9.

Figure 9:
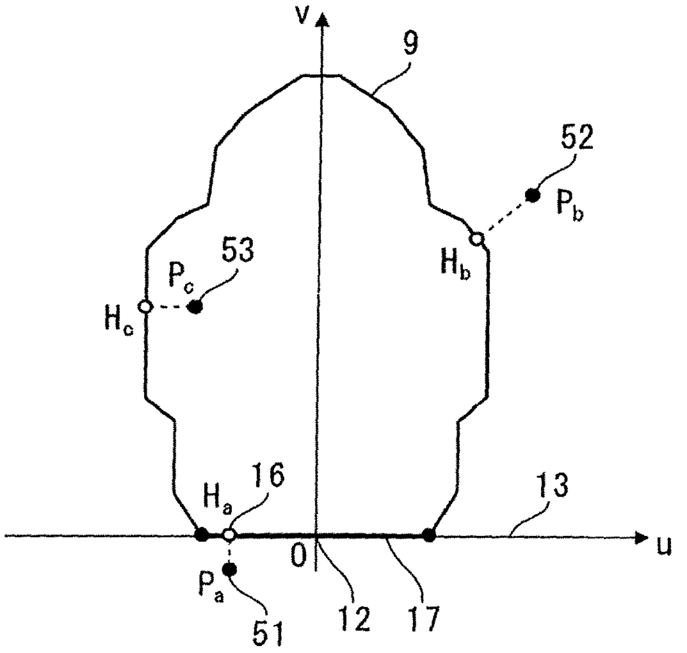
FIG. 9 is an explanatory diagram illustrating operation of an identification device included in the device for creating a construction gauge measurement diagram according to the first embodiment of the present invention.
Figure 12:
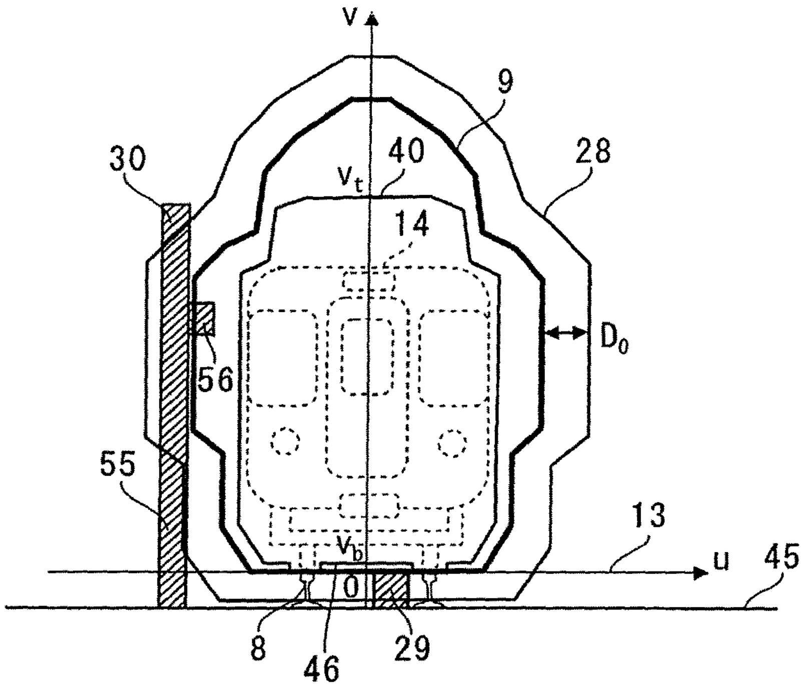
FIG. 12 is a cross-sectional view illustrating the relation between each of the construction gauge and a loading gauge, and a feature.

With reference to FIG. 9, the ground feature identification unit 3b identifies, for example, among the measurement points, the measurement point whose nearest point 16 is on a base 17 of the construction gauge 9 as a measurement point 51 of a feature 29 on the ground (FIG. 12). The base 17 is a portion facing parallel to the rail surface 13 at the bottom of the construction gauge 9. The approach or the entry to the construction gauge 9 of the feature 29 on the ground usually occurs toward the base 17 of the construction gauge 9, and therefore the measurement point has the nearest point 16 at the base 17 of the construction gauge 9. On the other hand, the approach or the entry to the construction gauge 9 of a feature 30 such as a signal or a fence installed along the track 12 usually occurs toward the side of the construction gauge 9, and therefore the measurement point does not have the nearest point at the base 17 of the construction gauge 9. According to this identification method, the identification as to whether or not the measurement point is of the feature on the ground can be performed depending on the shape of the construction gauge 9. For example, the measurement point $P_a$ is identified as the measurement point 51 of a feature on the ground because its nearest point $H_a$ is on the base 17. On the other hand, the measurement points $P_b$ and $P_c$ are identified as not the measurement points 51 of the feature on the ground because their nearest points $H_b$ and $H_c$ are not on the base 17.

The left-right identification unit 3*c* (FIG. 1) identifies which of the left side and the right side of the track 12 the measurement point that has been identified as not the feature on the ground in the above is located on. Specifically, depending on the sign of the coordinate $u_k$ of the measurement point $P_k$, the identification is made that if $u_k>0$, the measurement point $P_k$ is on the right side of the track 12, and otherwise, on the left side of the track 12. It should be noted that the identification of the left and the right may be performed based on, instead of the coordinates of the measurement point $P_k$, the coordinates of its nearest point $H_k$. In this case, the measurement point $P_b$ is identified as a measurement point 52 on the right side of the track because the u coordinate value of the nearest point $H_b$, of the measurement point $P_b$ is positive, and the measurement point $P_c$ is identified as a measurement point 53 on the left side of the track because the u coordinate value of the nearest point $H_c$ of the measurement point $P_c$ is negative.

(Function of Drawing Device)

Figure 10:
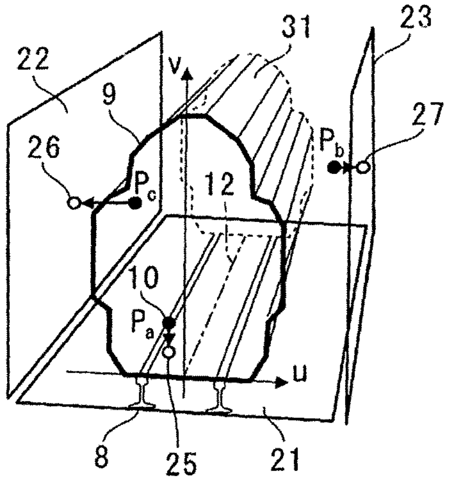
FIG. 10 is an explanatory diagram illustrating operation of a drawing device included in the device for creating a construction gauge measurement diagram according to the first embodiment of the present invention.
Figure 11:
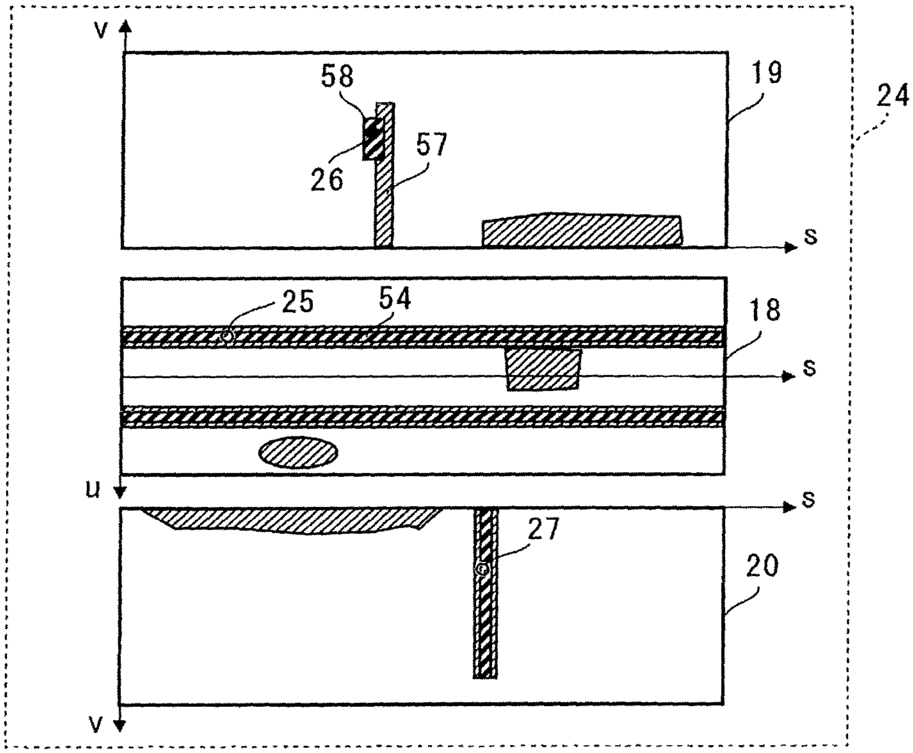
FIG. 11 is an explanatory diagram illustrating a configuration of the construction gauge measurement diagram according to the first embodiment of the present invention.

FIG. 10 is an explanatory diagram illustrating the operation of the drawing device 4 (FIG. 1). FIG. 11 is an explanatory diagram illustrating the configuration of a construction gauge measurement diagram 24 drawn by the drawing device 4. The drawing device 4 draws the measurement points identified to be on the ground, on the left side of the track, and on the right side of the track, respectively, in a plan view 18, a left side view 19, and a right side view 20, as the construction gauge measurement diagram 24.

As shown in FIG. 10, the drawing device 4 projects the measurement point 10 of the feature of the ground onto a point 25 on a horizontal projection surface 21, and the other measurement points 10 onto a point 26 of a left projection surface 22 along the track 12 or onto a point 27 of a right projection surface 23 along the track 12, respectively, in accordance with the left or the right. The pattern projected onto this horizontal projection surface 21 is set as the plan view 18, and the patterns projected onto the left projection surface 22 and the right projection surface 23 are respectively set as the left side view 19 and the right side view 20, whereby the situations of the approach or the entry to the construction gauge 9 of the measurement point 10 are represented.

Preferably, in the plan view 18, the mileage of the route of the track 12 is taken as the horizontal axis right direction, and the direction leftward perpendicular to the route of the track 12 is taken as the vertical axis upward direction. In addition, in the left side view 19, the mileage of the route of the track 12 is taken as the horizontal axis right direction, and the height direction is taken as the vertical axis upward direction. In addition, in the right side view 20, the mileage of the route of the track 12 is taken as the horizontal axis right direction, and the height direction is taken as the vertical axis downward direction.

In other words, in the plan view 18, the vertical axis indicates u in a downward direction, and the horizontal axis indicates the mileage s. In the left side view 19, the vertical axis indicates the height v in an upward direction, and the horizontal axis indicates the mileage s. In the right side view 20, the vertical axis indicates the height v in a downward direction, and the horizontal axis indicates the mileage s. Each horizontal axis is arranged so that the same position in the horizontal direction represents the same mileage. With this arrangement, when the left side view 19, the plan view 18, and the right side view 20 (FIG. 11) are arranged in order from the top, the left projection surface 22, the horizontal projection surface 21, and the right projection surface 23 (FIG. 10) corresponding to the respective views are formed such that the views are developed continuously, and therefore the understanding of the construction gauge measurement diagram becomes easier.

It should be noted that the linear portion of the track 12 is described in FIGS. 10 and 11, and the curved portion of the track 12 is also drawn in the same way so that the horizontal axis indicates the mileage. In addition, for example, when the construction gauge measurement diagram is represented in document, the scale of the horizontal axis set as the mileage is set in accordance with the amount of the space allowed to be used for the construction gauge measurement diagram so that all of the measurement range of the track 12 fits in the limited space.

The drawing device 4 refers to the identification result of the measurement point 10 by the identification device 3 (FIG. 1), and draws a point or a predetermined figure at the point 25 ($S_k$, $u_k$) of the plan view 18 if the measurement point 10 is a measurement point on the ground. In addition, when the measurement point 10 is not a measurement point on the ground, the drawing device 4 draws by using a point or a predetermined figure at the point 26 ($S_k$, $v_k$) of the left side view 19 if the measurement point 10 is on the left side of the track, and at the point 27 ($S_k$, $v_k$) of the right side view 20 if the measurement point 10 is on the right side of the track.

As the types of the drawing process, firstly, there are types of the measurement point 10 being treated as display data, or as non-display data. In the present embodiment, the measurement point 10 neither entering nor approaching the construction gauge 9, that is, the measurement point 10 not falling within a predetermined range from the construction gauge 9 is treated as non-display data. On the other hand, if the measurement point is treated as display data, as the types of the method (form) of the drawing process, there are types of symbols in drawing. The types of symbols can be distinguished depending on the shape, the pattern, or the color. The shape of the symbol is typically a point or a figure as described above, and the figure may be a mark. When the construction gauge measurement diagram is drawn in the ordinary display, the shape of the symbol is constituted by the pixel as a unit. The selection of the types of symbols can be based on whether or not the measurement point 10 has entered the construction gauge 9, the distance between the construction gauge 9 and the measurement point 10, and the like. For example, the measurement point 10 located inside the construction gauge 9 is drawn in red to indicate warning, drawn largely, or drawn in a deep color. In addition, for example, among the measurement points $P_k$ approaching the construction gauge 9, the measurement point $P_k$ with a particularly small distance $D_k$ is drawn with a yellow symbol so as to draw attention, and the measurement point $P_k$ with a distance $D_k$ kept large is drawn with a small symbol having a pale color. The color of drawing may be allowed to smoothly transition depending on the distance $D_k$. In addition, in drawing a plurality of measurement points, when there is an overlap in the position of drawing the symbol, a symbol to be displayed in the front may be selected in accordance with a predetermined rule. For example, as the distance $D_k$ is smaller, the measurement point may be drawn in the front so as not to be hidden by the other measurement points. As described above, the drawing device 4 makes the types of drawing process for drawing the measurement point different depending on the identification result of the identification device 3.

The value $D_0$ for determining the range in which the measurement point is identified to approach the construction gauge 9 is not so large in general as compared with the size of the construction gauge 9 itself. For this reason, as shown in FIG. 12, a range 28 of the measurement point 10 to be the drawing object to the construction gauge measurement diagram 24 is limited to the inside of the predetermined range 28 along the outer edge of the construction gauge 9. In the present embodiment, the measurement point falling within this range 28 is drawn by being divided into the plan view 18, the left side view 19, and the right side view 20.

In the plan view 18, the measurement point of the feature 29 on the ground is drawn. The feature 29 on the ground such as equipment installed on the ground, such as a ground coil of the automatic train stop device, approaches or enters the construction gauge 9 when its height is about the height of the rail surface 13. The position of the feature 29 on the ground can be suitably shown by the position on the horizontal plane, that is, by the mileage along the track 12 and the position in the left and right directions of the track 12. This is because it is possible to easily identify the corresponding sections on-site if the positions are known. Therefore, the plan view 18 having the respective axes corresponding to s representing the mileage and u representing the position in the left and right direction is used, whereby the position of the feature 29 on the ground approaching or entering the construction gauge 9 can be suitably represented.

Here, the rails 8 constitute the rail surface 13, and therefore when the rail surface 13 and the lower side of the construction gauge 9 match, the rails 8 are to approach the construction gauge 9. The plan view 18 in FIG. 11 reflects this. That is, in the plan view 18, points are drawn in a region 54 extending in the horizontal direction corresponding to the rails 8, and FIG. 11 schematically represents the situations by using the hatching. In the plan view 18, the measurement point of the approaching feature 29 on the ground (FIG. 12) is drawn in addition to the rails 8.

On the other hand, in the left side view 19 and the right side view 20 (FIG. 11), other measurement points other than the feature 29 on the ground (FIG. 12), typically, the measurement points of the feature 30 (FIG. 12) installed along the track is drawn. The feature 30 such as the equipment installed along the track, for example, a signal, a sign, supports of these, or a fence is drawn. These features approach or enter the construction gauge 9 when these features excessively approach the side of the track 12. The feature 30 installed along the track can be suitably shown by the position along the track 12 (mileage), the height position of the portion approaching or entering the construction gauge 9, and the distinction of which of the left side and the right side of the track the feature is located on. This is because it is possible to easily identify the corresponding sections on-site if the positions are known. Therefore, by the representation of the left and right side views with the axes of s representing the mileage and v representing the height, the situations of the approach or the entry to the construction gauge 9 of the feature 30 installed along the track 12 can be suitably represented.

Regions 57 and 58 near the center of the left side view 19 (FIG. 11) schematically show the situations where the measurement point of the feature 30 installed along the track 12 (FIG. 12) is drawn by using the hatching. The point corresponding to a support 55 approaching the construction gauge 9 is drawn in the region 57 extending longitudinally, and the measurement point of installation equipment 56 falling within the construction gauge 9 overlaps on top of the region 57 as the region 58. In addition, the left side view 19 and the right side view 20 are views in which the measurement point of the other features 30, installed along the track 12, entering or approaching the construction gauge 9 is drawn.

In addition, in the railway field, a limit that must not be exceeded is set in not only the track 12 but also the vehicle as a loading gauge 40 (FIG. 12). The construction gauge 9 is set outside the loading gauge 40 with a margin of space. The feature 29 on the ground is considered not to fall within the loading gauge 40 even if it falls within the construction gauge 9, that is, usually, the feature 29 is considered not to be so high as to exceed a base 46 facing parallel to the rail surface 13 of the loading gauge 40. Thus, the v coordinate value of the base 46 of the loading gauge 40 is set as $v_b$, and in the case of $v_k \leq v_b$, the measurement point $P_k$ may be identified as the measurement point of the feature 29 on the ground. In this case, the ground feature identification unit 3*b* (FIG. 1) identifies, among the measurement points 10, the measurement point whose height from the rail surface (more generally, the surface on which the wheels of the vehicle passing the track roll) is $v_b$ (the predetermined value) or less as the measurement point of the feature on the ground. In this case, the identification as to whether or not the measurement point 10 is the measurement point of the feature on the ground can be performed based on a concise reference.

(Method for Creating Construction Gauge Measurement Diagram)

Figure 13:
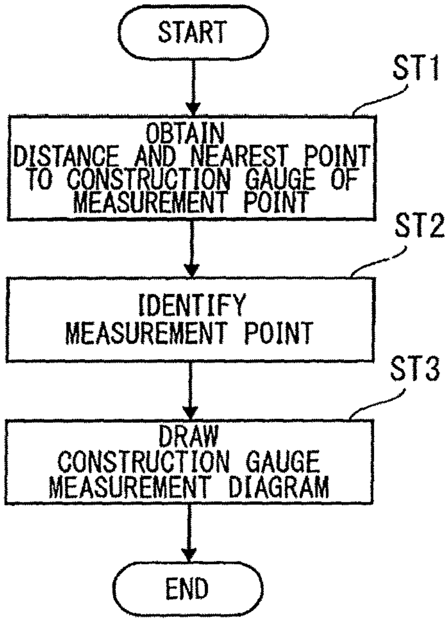
FIG. 13 is a flowchart of a method for creating a construction gauge measurement diagram according to the first embodiment of the present invention.

FIG. 13 is a flowchart of a method for creating a construction gauge measurement diagram according to the present embodiment. In step ST1, the distance measurement device 2 obtains, for each measurement point 10, the nearest point 16 on the construction gauge 9 and the distance to the construction gauge 9. In step ST2, the identification device 3 performs the identification of the attributes of the measurement point 10. In step ST3, the drawing device 4 performs drawing of the construction gauge measurement diagram 24 (FIG. 11).

Figure 14:
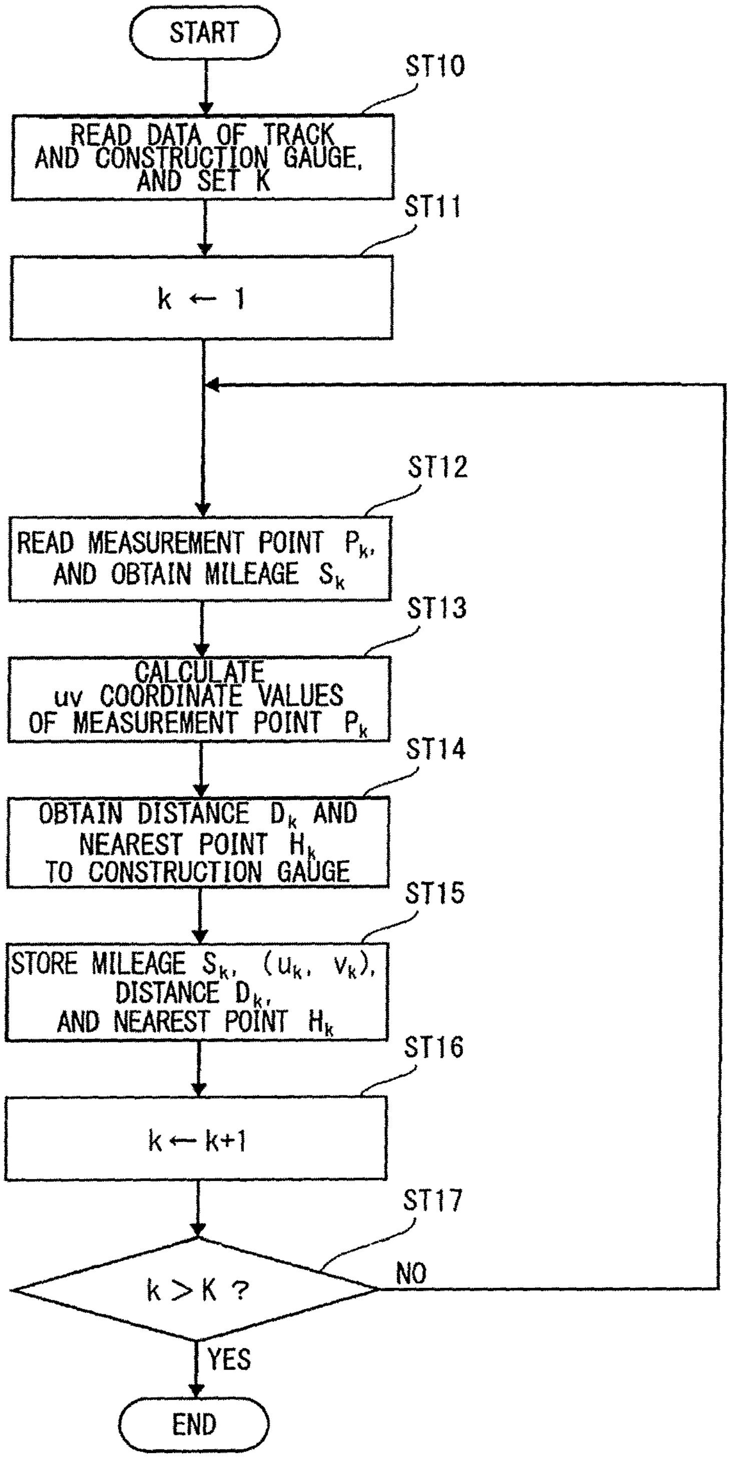
FIG. 14 is a flowchart illustrating the operation of the distance measurement device in the method for creating a construction gauge measurement diagram according to the first embodiment of the present invention.

With reference to FIG. 14, in step ST1 (FIG. 13), the operation performed by the distance measurement device 2 will be described in detail below.

In step ST10, the distance measurement device 2 reads the track data 5 and the construction gauge data 6 from the storage device 1. In addition, the variable K indicating the number of pieces of data of the measurement points is set.

In step ST11, the distance measurement device 2 sets the variable k specifying the measurement point $P_k$ to be processed as 1 among the measurement point data 7 (FIG. 3).

In step ST12, the distance measurement device 2 reads the data of the k-th measurement point $P_k$ among the measurement point data 7 of the storage device 1, and obtains the track nearest point 15 to the track 12. In addition, the mileage of the track nearest point 15 is set as the mileage $S_k$ of the measurement point $P_k$. The mileage $S_k$ is the length along the track 12 of the track nearest point 15 as described above, may be obtained by the integration of the distance from the start point of the track 12, or may be obtained by the interpolation from the front and rear track points of the track nearest point 15 if the mileage is previously defined in the track point $Q_i$.

In step ST13, the distance measurement device 2 calculates the uv coordinate values $(u_k, v_k)$ from the coordinate values $(X_k, Y_k, Z_k)$ of the measurement point $P_k$. In step ST14, the distance measurement device 2 obtains the distance $D_k$ of the measurement point $P_k$ in the uv coordinate plane, and the nearest point $H_k$ giving the distance. When the measurement point 10 falls within the construction gauge 9, the sign of the distance $D_k$ is set as negative. In step ST15, the distance measurement device 2 stores the mileage $S_k$, $(u_k, v_k)$, the distance $D_k$, and the nearest point $H_k$, in the storage device 1 (FIG. 1). In step ST16, 1 is added to k.

In step ST17, the distance measurement device 2 determines whether or not k is larger than K. If so, then the step ST1 ends, otherwise, the process returns to step ST12.

Figure 15:
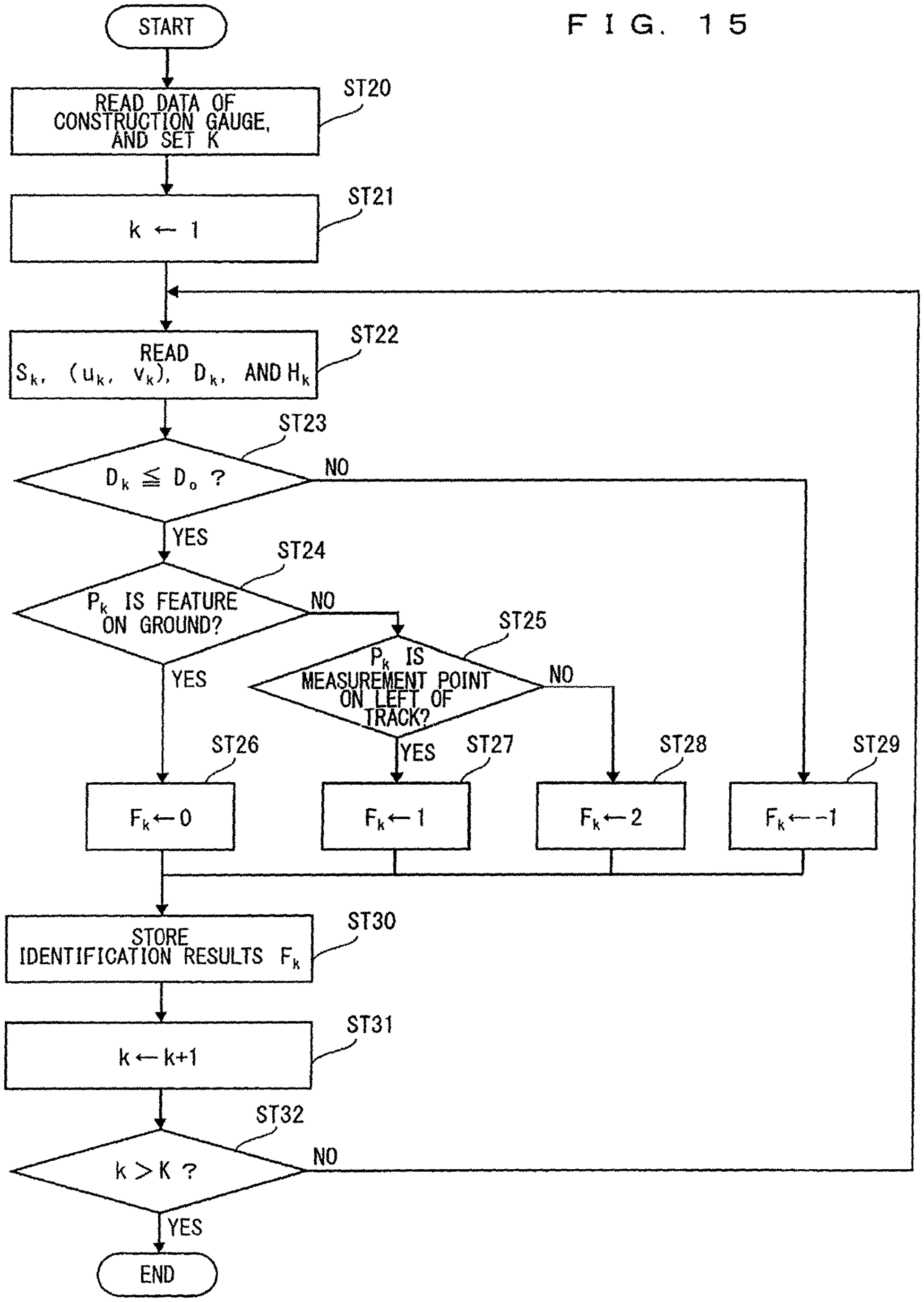
FIG. 15 is a flowchart illustrating the operation of the identification device in the method for creating a construction gauge measurement diagram according to the first embodiment of the present invention.

With reference to FIG. 15, the operation performed by the identification device 3 in step ST2 (FIG. 13) will be described in detail below.

In step ST20, the identification device 3 reads the construction gauge data 6 from the storage device 1. In addition, the variable K indicating the number of pieces of data of the measurement points is set.

In step ST21, the identification device 3 sets the variable k specifying the measurement point $P_k$ to be processed as 1 among the measurement point data 7 (FIG. 3).

In step ST22, the identification device 3 reads the mileage $S_k$, $(u_k, v_k)$, the distance $D_k$, and the nearest point $H_k$ of the measurement point $P_k$ from the storage device 1.

In step ST23, the identification device 3 determines whether or not the distance $D_k$ is the predetermined threshold value $D_0$ or less. It should be noted that if the value $D_0$ is set as 0, only the measurement point falling within the construction gauge 9 can be set as the drawing object. If the distance $D_k$ is the threshold value $D_0$ or less, the identification device 3 proceeds to step ST24, otherwise, proceeds to step ST29.

In step ST24, the identification device 3 identifies whether or not the measurement point $P_k$ is the measurement point of the feature 29 on the ground. Specifically, as described above, it is determined depending on whether the nearest point $H_k$ is on the base 17 of the construction gauge 9, or whether $v_k \leq v_h$ or not. If the measurement point $P_k$ is the measurement point of the feature 29 on the ground, the identification device 3 proceeds to step ST26, otherwise, proceeds to step ST25.

In step ST25, whether or not the measurement point $P_k$ is the feature on the left side of the track is identified. As described above, this is identified depending on whether or not the u coordinate value $u_k$ is 0 or less. If the measurement point $P_k$ is on the left side of the track, the identification device 3 proceeds to step ST27, otherwise, proceeds to step ST28.

In step ST26, in response to the measurement point $P_k$ being identified as the feature 29 on the ground, a variable $F_k$ indicating the identification result is set to "0" representing the feature on the ground. In step ST27, in response to the measurement point $P_k$ being identified to be on the left side of the track, the variable $F_k$ indicating the identification result is set to "1" representing the left side of the track. In step ST28, in response to the measurement point $P_k$ being identified to be on the right side of the track, the variable $F_k$ indicating the identification result is set to "2" representing the right side of the track. In step ST29, in response to the measurement point $P_k$ being identified as not falling within a predetermined range from the construction gauge 9, in other words, in response to the measurement point $P_k$ being identified as keeping a sufficient distance from the construction gauge 9, the variable $F_k$ indicating the identification result is set to "−1". In step ST30, the variable $F_k$ indicating the identification result is stored in the storage device 1.

In step ST31, the identification device 3 adds 1 to k. In step ST32, whether or not k is larger than K is determined. If so, then step ST32 ends, otherwise, the process returns to step ST22.

Figure 16:
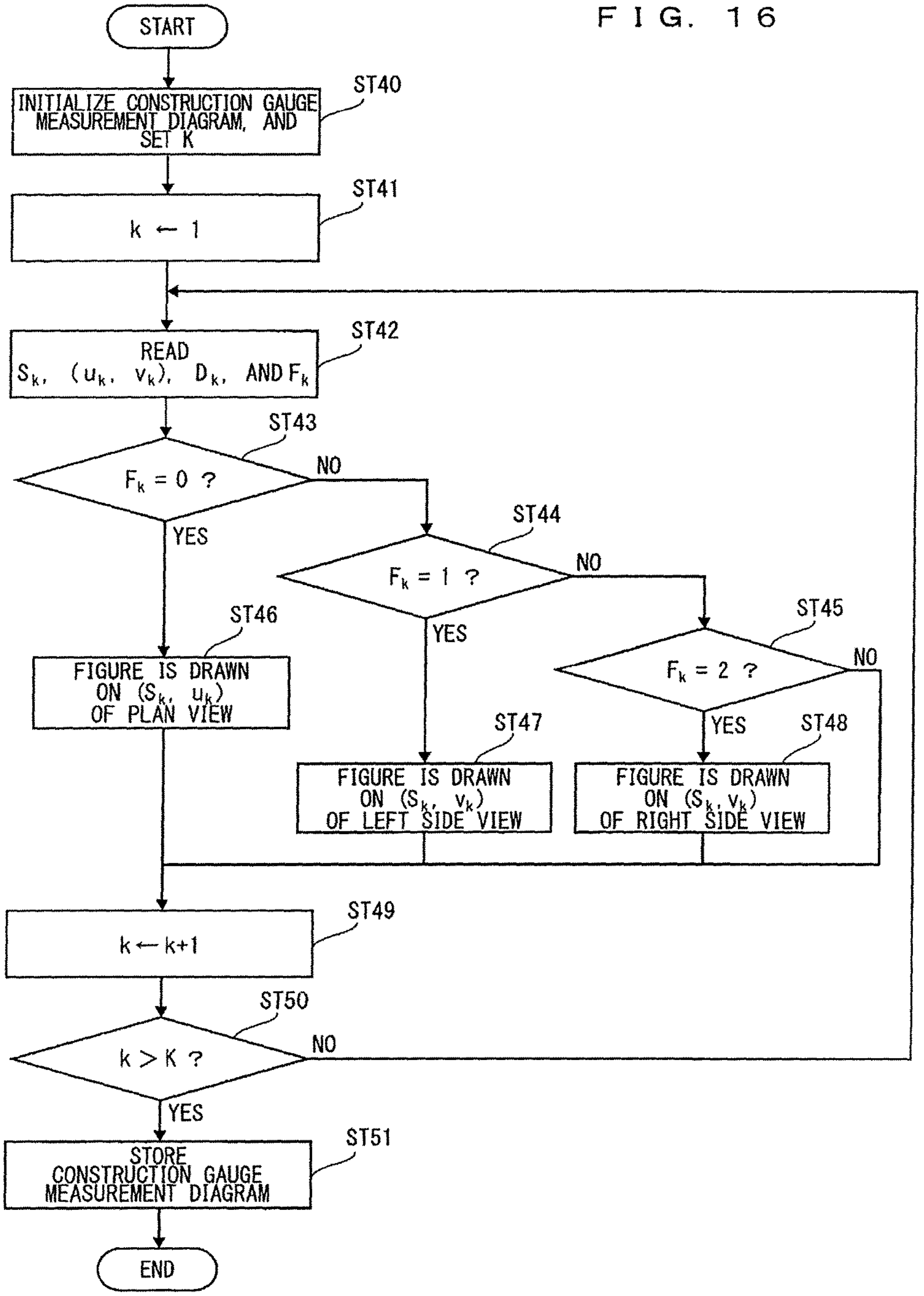
FIG. 16 is a flowchart illustrating the operation of the drawing device in the method for creating a construction gauge measurement diagram according to the first embodiment of the present invention.

With reference to FIG. 16, the operation performed by the drawing device 4 in step ST3 (FIG. 13) will be described in detail below.

In step ST40, the drawing device 4 initializes the construction gauge measurement diagram 24 to the state of not being drawn, and sets the variable K indicating the number of pieces of data of the measurement points. In step ST41, the variable k indicating the measurement point data is set to 1. In step ST42, the mileage $S_k$, $(u_k, v_k)$, the distance $D_k$, and the identification result $F_k$ of the measurement point $P_k$ are read from the storage device 1.

In step ST43, the drawing device 4 determines whether or not the k-th measurement point $P_k$ is identified as the measurement point of the feature 29 on the ground. If the measurement point $P_k$ is identified as the measurement point of the feature 29 on the ground, the process proceeds to step ST46, otherwise, the process proceeds to step ST44.

In step ST44, the drawing device 4 determines whether or not the k-th measurement point $P_k$ is identified to be on the left side of the track. If it is identified so, the process proceeds to step ST47, otherwise, the process proceeds to step ST45.

In step ST45, the drawing device 4 determines whether or not the k-th measurement point $P_k$ is identified to be on the right side of the track. If it is identified so, the process proceeds to step ST48, otherwise, the process proceeds to step ST49.

In step ST46, in terms of the measurement point $P_k$, the drawing device 4 draws a drawing point 25 at the $(S_k, u_k)$ of the plan view 18. In step ST47, in terms of the measurement point $P_k$, a drawing point 26 is drawn at $(S_k, v_k)$ of the left side view 19. In step ST48, in terms of the measurement point $P_k$, a drawing point 27 is drawn at $(S_k, v_k)$ of the right side view. In steps ST46 to ST48, as described above, depending on whether the measurement point $P_k$ falls within the construction gauge 9 (that is, $D_k \leq 0$), or whether it approaches the construction gauge 9 (that is, $D_0 \geq D_k > 0$), the symbol such as the size and color of the drawing point is changed. In addition, when the drawing region is already drawn with the symbol corresponding to the distance smaller than the distance $D_k$ of the measurement point $P_k$, the point regarding the measurement $P_k$ is not overwritten so that the measurement result with a smaller distance is not erased.

In step ST49, the drawing device 4 adds 1 to k. In step ST50, whether or not k is larger than K is determined. If so, then the process proceeds to step ST51, otherwise, the process returns to step ST42. In step ST51, the plan view 18, the left side view 19, and the right side view 20 are stored in the storage device 1 as one set of the construction gauge measurement diagram 24. Thus, the construction gauge measurement diagram 24 is obtained.

The construction gauge measurement diagram 24 stored in the storage device 1 can be output by the output device (not shown). Specifically, the construction gauge measurement diagram 24 may be electronically displayed on the screen by a display, and may be printed as a paper document by a printer or a plotter. The measurement point 10 has three-dimensional coordinates, and therefore if this is to be expressed in document, the object of the two variables respectively assigned to the vertical and horizontal axes in document must be selected appropriately. In the present embodiment, as described above, the mileage and the u coordinate value are selected as the two axes with respect to the measurement point of the feature 29 on the ground, and the mileage and the v coordinate value are selected as the two axes with respect to the measurement point of the feature 30 along the track. On top of that, the form such as color and size of the figure to be drawn is changed, whereby the distance to the construction gauge 9 is represented. In this way, the hindrance to the on-site identification of the feature approaching or entering the construction gauge 9 does not occur. Although the v coordinate value is discarded in terms of the feature 29 on the ground, and the u coordinate value is discarded in terms of the feature 30 along the track, the importance of the v coordinate value is low in the identification of the feature 29 on the ground close to the rail surface 13, and the importance of the u coordinate value is low in the identification of the feature 30 along the track. That is, according to the present embodiment, the construction gauge measurement results are represented as a set of the drawings with the two axes of the vertical and horizontal axes while retaining the information important to the identification of the feature.

(Summary of Operations and Effects)

According to the present embodiment, among the measurement points 10, different drawing processes are performed on the measurement points identified as falling within the predetermined range from the construction gauge 9 by the range identification unit 3*a* and the measurement points identified as not falling within the predetermined range from the construction gauge 9 by the range identification unit 3*a*. Therefore, from the construction gauge measurement diagram 24 (FIG. 11), the measurement point falling within the predetermined range from the construction gauge 9, that is, the measurement point approaching or entering the construction gauge 9 can be grasped.

In addition, the construction gauge measurement results over a wide area can be condensed by using the plan view 18 and the side views 19 and 20. The measurement point 10 of the feature on the ground is drawn in the plan view 18, whereby the position on the ground can be grasped from the plan view 18, and this allows the feature on the ground to be easily identified on-site. In addition, the measurement point 10 not of the feature on the ground is drawn in the side views 19 and 20, whereby the height position can be grasped from the side views 19 and 20, and this allows the feature not on the ground to be easily identified on-site.

As described above, there can be obtained the construction gauge measurement diagram capable of condensedly displaying the measurement point 10 while maintaining particularly useful information for identifying on-site the position of the feature corresponding to the measurement point 10 entering or approaching the construction gauge 9.

In the present embodiment, the drawing device 4 (FIG. 1) draws the measurement point identified as falling within the predetermined range from the construction gauge 9 by the range identification unit 3*a* among the measurement points 10, and does not draw the measurement point identified as not falling within the predetermined range from the construction gauge 9 by the range identification unit 3*a* among the measurement points 10. As a result, only the measurement point approaching or entering the construction gauge 9 among the measurement points 10 can be grasped from the measurement diagram.

In addition, the drawing device 4 (FIG. 1) draws the measurement point identified to be located on the left side by the left-right identification unit 3*c* among the measurement points 10 in the left side view 19, and draws the measurement point identified to be located on the right side by the left-right identification unit 3*c* among the measurement points 10 in the right side view 20 (see FIG. 11). As a result, it is possible to grasp which of the left side and the right side of the track the measurement point 10 of the feature not on the ground is located on from the construction gauge measurement diagram 24.

(Modification)

Although in the above embodiment, as the method for identifying whether or not the measurement point 10 is the measurement point of the feature on the ground, the method based on the position of the nearest point $H_k$ to the construction gauge 9 of the measurement point $P_k$ or the comparison between the v coordinate value $v_k$ of the measurement point $P_k$ and the v coordinate value $v_b$ of the loading gauge 40 is described, other methods may be used. For example, even if the identification based on the v coordinate value $v_k$ of the measurement point $P_k$ is performed, the identification may be performed by using the value determined separately from the loading gauge 40, for example, whether or not 0.05 m or less.

In addition, although in the above embodiment, the identification of detailed attributes (FIG. 15: steps ST26 to ST28) and the subsequent drawing process are performed only on the measurement point $P_k$ having a distance $D_k$ of $D_0$ or less, the identification of detailed attributes and the drawing may be performed on all the measurement points 10, regardless of the value of the distance $D_k$. Alternatively, the measurement point 10 in a predetermined range, for example, within 3 m, from the track 12 may be selectively drawn. In this case, the drawing device 4 (FIG. 1) draws the measurement point identified as falling within the predetermined range from the construction gauge 9 by the range identification unit 3*a* among the measurement points 10, and the measurement point identified as not falling within the predetermined range from the construction gauge 9 by the range identification unit 3*a* among the measurement points 10 by using different symbols. As a result, while the measurement point approaching or entering the construction gauge 9 among the measurement points 10 is selectively grasped, the situation can be grasped also for the measurement point having a margin for the construction gauge 9 at the same time. Therefore, the margin for the construction gauge 9 can be grasped. The measurement point $P_k$ with the distance $D_k$ exceeding $D_0$ is preferably drawn less conspicuously than the measurement point without the distance $D_k$ exceeding $D_0$, and for example, is drawn in a pale color, and is drawn so as not to appear in the front compared with the drawing of the measurement point approaching or entering the construction gauge 9.

In addition, the reflection intensity of the laser beam during the measurement of the measurement point 10 may be reflected in the color and the brightness when the measurement point 10 is drawn in the construction gauge measurement diagram. The reflection intensity of the laser beam is correlated with the light reflectance of the measurement point 10, and therefore, the construction gauge measurement diagram representing the local landscape can be obtained. For example, when all of the measurement points 10 are set as the object of the drawing, the measurement point with the distance D exceeding $D_0$ is drawn with the reflection intensity of the laser, and the measurement point with the distance D being $D_0$ or less may be drawn by using the symbol corresponding to the entry or the approach to the construction gauge 9. This allows the landscape of the background of the symbol representing the measurement point entering or approaching the construction gauge 9 in the construction gauge measurement diagram to be represented by the measurement points far from the construction gauge 9. In addition, a photographic image is captured at the same time as the measurement of the measurement point 10, and the drawing may be performed with the color of the measurement point obtained from the pixel value. In addition, with the photographic image captured on-site as a background, the construction gauge measurement diagram may be drawn over that. In addition, the measurement point 10 entering or approaching the construction gauge 9 may be drawn bright by adding the value of the reflection intensity, and the measurement point 10 with the distance D exceeding $D_0$ may be drawn dark by subtracting the value of the reflection intensity.

In addition, although in the above embodiment, not only the measurement point 10 inside the construction gauge 9 but also the measurement point 10 approaching the construction gauge 9 is drawn, only the measurement point falling within the construction gauge 9 may be drawn by setting $D_0=0$. Alternatively, each of the measurement point 10 falling within the construction gauge 9 and the measurement point 10 approaching the construction gauge 9 may be drawn as an individual construction gauge measurement diagram 24.

In addition, although in the above embodiment, the construction gauge measurement diagram 24 is drawn by drawing a point or a figure for each of the measurement points 10, when there is a feature entering or approaching the construction gauge, the measurement points entering or approaching the construction gauge are obtained densely in response to the feature, and therefore for each set of these cohesive measurement points, a closed curve figure such as a polygon including these may be drawn on the construction gauge measurement diagram. In this case, the color for filling the above figure may be changed so as to represent the entry or the approach to the construction gauge 9. Alternatively, the drawing represented by one figure may be made for each set of measurement points cohesive for each feature.

In addition, although in the above embodiment, the v-axis being the vertical axis in the right side view 20 is taken downward, the v-axis may be taken upward in the same manner as in the left side view 19. In this case, the right side view 20 is not vertically inverted either. In addition, although in the construction gauge measurement diagram 24 (FIG. 11), the plan view 18, the left side view 19, and the right side view 20 are drawn as separate drawings, the left side view 19, the plan view 18, and the right side view 20 may be drawn as one drawing arranged vertically in this order.

In addition, although in the above embodiment, a straight section is assumed, and the u-axis is described to be horizontal, and the v-axis is described to be vertical, when the cant is attached to the track in the curve, the uv coordinate system may be rotated as much as the angle of the cant of the nearest point 15 on the track so that the u-axis matches the rail surface 13. Alternatively, the uv coordinate system is not rotated, and the construction gauge 9 may be rotated. In addition, the construction gauge 9 is expanded in the curve, and therefore the construction gauge 9 may be expanded in accordance with the radius of the curve of the nearest point 15 on the track. The angles of these cants and the radii of these curves may be stored in the storage device 1 in association with each point $Q_i$ of the track data 5.

In addition, although in the above embodiment, two side views of the left side view 19 and the right side view 20 are created, when a structure requiring attention does not exist on one side of the track, the corresponding side view is not created, and the construction gauge measurement diagram 24 may be configured by the plan view 18 and one of the side views.

Furthermore, the construction gauge measurement diagram 24 may be configured by the plan view 18 when the measurement results of only the feature 29 on the ground are desired to be shown, and by the left side view 19 and/or the right side view 20 when the measurement results of only the feature along the track 12 are desired to be shown.

In addition, although in the above embodiment, the track $Q_i$ (FIG. 4) is described as having been obtained, the detection of the rails 8 may be performed from the measurement point $P_k$, and the data $Q_i$ of the track may be obtained with the path center as the track 12. In that case, as described above, it is obvious that the rails 8 approach the construction gauge 9, and therefore the measurement point 10 of the rails 8 does not have to be drawn in the plan view 18.

In addition, although in the above embodiment, from the operation of the distance measurement device 2 in step ST1 to the operation of the drawing device 4 in step ST3, the operation is performed so that the process in each step is executed on all the measurement points $P_k$ and then proceed to the next step, it may be configured that, for each measurement point $P_k$, the distance $D_k$ to the construction gauge 9 and the nearest point $H_k$ are obtained, the identification is performed, and the drawing on the construction gauge measurement diagram is repeated.

In addition, although in the above embodiment, the construction gauge measurement diagram is drawn by drawing a point or a figure, the value of the distance $D_k$ may be displayed in the measurement point $P_k$ with the distance $D_k$ being relatively small or minimum so that the degree of entering or approaching the construction gauge 9 is more specifically shown.

In addition, although in the above embodiment, the distance $D_k$ is set as 0 or negative when the measurement point 10 falls within the construction gauge 9, the $D_k$ may be set as the distance between the measurement point 10 and the nearest point 16, and the variable indicating whether or not the measurement point 10 falls within the construction gauge 9 may be used separately.

<Second Embodiment>

(Summary)

In the present embodiment, there will be described the case where the track data 5 stored by the storage device 1 (FIG. 1) relate to the route of a plurality of tracks running side by side.

Figure 17:
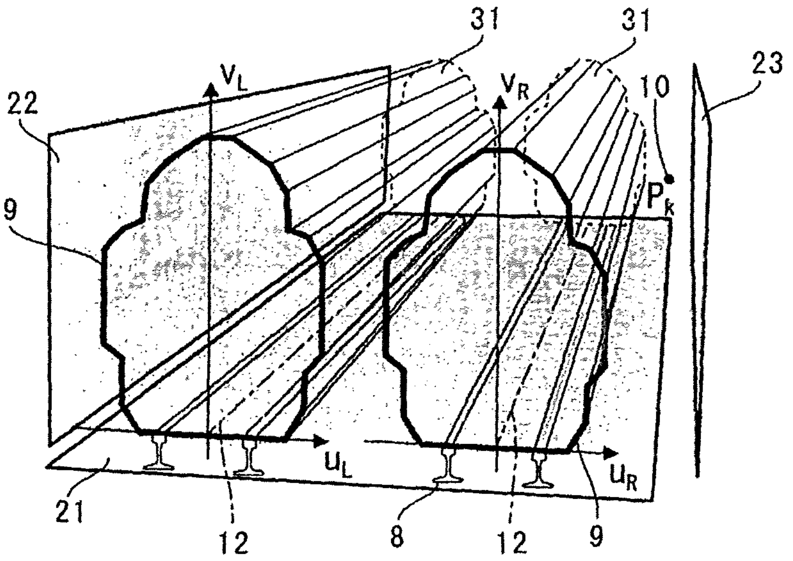
FIG. 17 is an explanatory diagram illustrating an example of a track, a construction gauge, and measurement points handled by a device for creating a construction gauge measurement diagram according to a second embodiment of the present invention.

FIG. 17 illustrates an example of the tracks 12, the construction gauges 9, and the measurement points 10 handled by the creating device of the construction gauge measurement diagram (FIG. 18) according to the present embodiment. Unlike the case of the first embodiment (FIG. 2), a construction gauge 9 is set in each of the plurality of tracks 12 running side by side. Whether or not a certain structure is the obstacle to transportation should be determined by the distance between this structure and the construction gauge 9 closest thereto. Then, the smallest value among the distances between each measurement point $P_k$ and a plurality of construction gauges 9 is set as the distance $D_k$, and the construction gauge measurement diagram 24 is created based on this. In addition, in the present embodiment, the construction gauge measurement diagram for each track 12 is not created, and the construction gauge measurement diagram handling two tracks 12 running side by side is created. Therefore, the plan view 18 includes a range of two tracks 12. The construction gauge measurement diagram 24 is configured by the plan view 18, the left side view 19 of the track on the left side, and the right side view 20 of the track on the right side corresponding to the plan view 18.

(Operation of Device for Creating Construction Gauge Measurement Diagram)

Although the device for creating a construction gauge measurement diagram of the present embodiment has the same basic configuration as that of the first embodiment (FIG. 1), there is a difference in the configuration of each portion. In the following, this difference will be mainly described.

The distance measurement device 2 (FIG. 1) calculates the distances $D_{Lk}$ and $D_{Rk}$ between each of the construction gauges 9 of the two left and right tracks 12 and the measurement point $P_k$ in the present embodiment. The distance with the minimum value among them is set as the distance $D_k$ between the measurement point 10 and the construction gauge 9. In addition, among the nearest points $H_{Lk}$ and $H_{Rk}$ to the respective two construction gauges 9, the nearest point giving the minimum value is set as the nearest point $H_k$. When the measurement point $P_k$ falls within any one of the construction gauges 9, the distance $D_k$ is given a negative sign.

Figure 19:
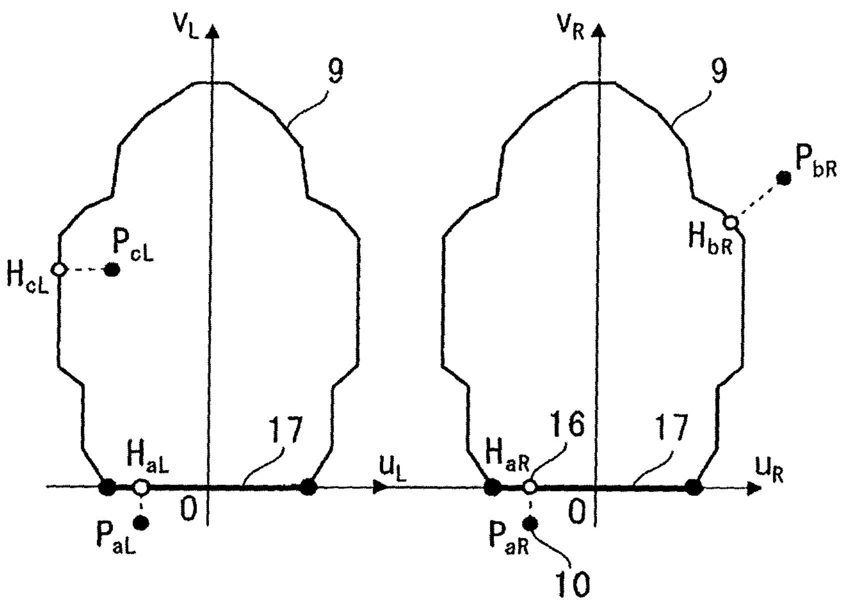
FIG. 19 is an explanatory diagram illustrating operation of an identification device included in the device for creating a construction gauge measurement diagram according to the second embodiment of the present invention.
Figure 20:
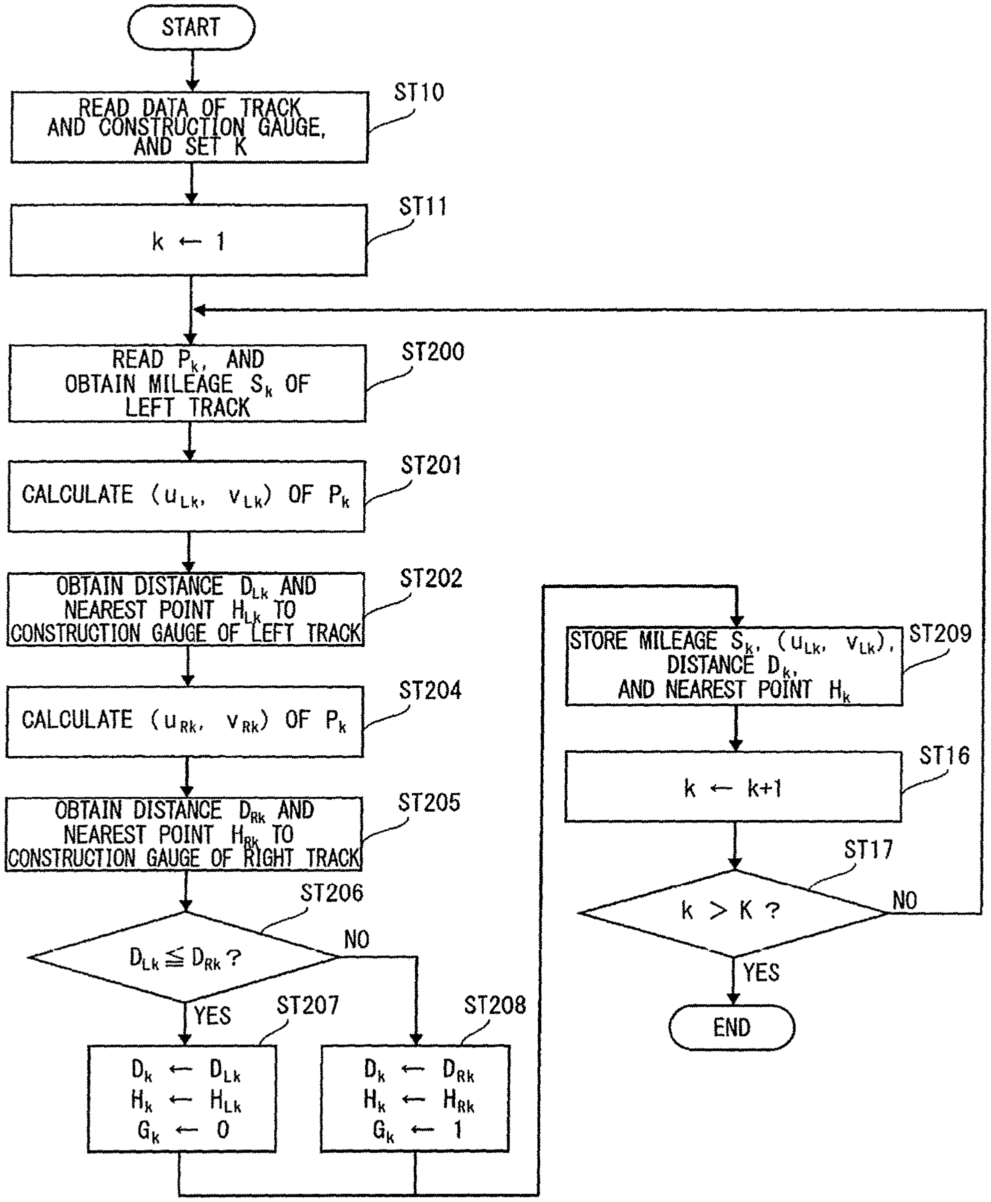
FIG. 20 is a flowchart illustrating operation of a distance measurement device in a method for creating a construction gauge measurement diagram according to the second embodiment of the present invention.

FIG. 19 is an explanatory diagram illustrating the operation of the identification device 3 (FIG. 1). The uv plane of the track 12 on the left side is represented as the $u_Lv_L$ plane, and the uv plane of the track 12 on the right side is represented as the $u_Rv_R$ plane. Although details will be described later, the identification device 3 performs the identification by using the distance $D_k$ and the nearest point $H_k$ (FIG. 20). Specifically, the identification device 3 identifies which of the construction gauges 9 the measurement point 10 falls within, or which of the construction gauges 9 the measurement point 10 approaches in the present embodiment. For example, when the nearest point 16 is on the base 17 of the construction gauge 9, the measurement point 10 is identified as the measurement point of the feature 29 on the ground. Furthermore, for the measurement point 10 other than that, it is identified to have the right attributes if there is the nearest point 16 on the construction gauge 9 of the track 12 on the right side, and it is identified to have the left attributes if there is the nearest point 16 on the construction gauge 9 of the track 12 on the left side.

For example, in the figure, the nearest points $H_{aL}$ and $H_{aR}$ of the respective measurement points $P_{aL}$ and $P_{aR}$ are located on the base 17 of the construction gauge 9. Therefore, the measurement points $P_{aL}$ and $P_{aR}$ are identified as the measurement points of the feature 29 on the ground. On the other hand, the nearest points $H_{bR}$ and $H_{cL}$ of the respective measurement points $P_{bR}$ and $P_{cL}$ are not on the base 17 of the construction gauge 9. In this case, the identification of the left and right attributes is performed. Specifically, the measurement point $P_{bR}$ is identified to have the right attributes because the nearest point $H_{bR}$ is on the construction gauge 9 of the track on the right side, and the measurement point $P_{cL}$ is identified to have the left attributes because the nearest point $H_{cL}$ is on the construction gauge 9 of the track on the left side.

Figure 18:
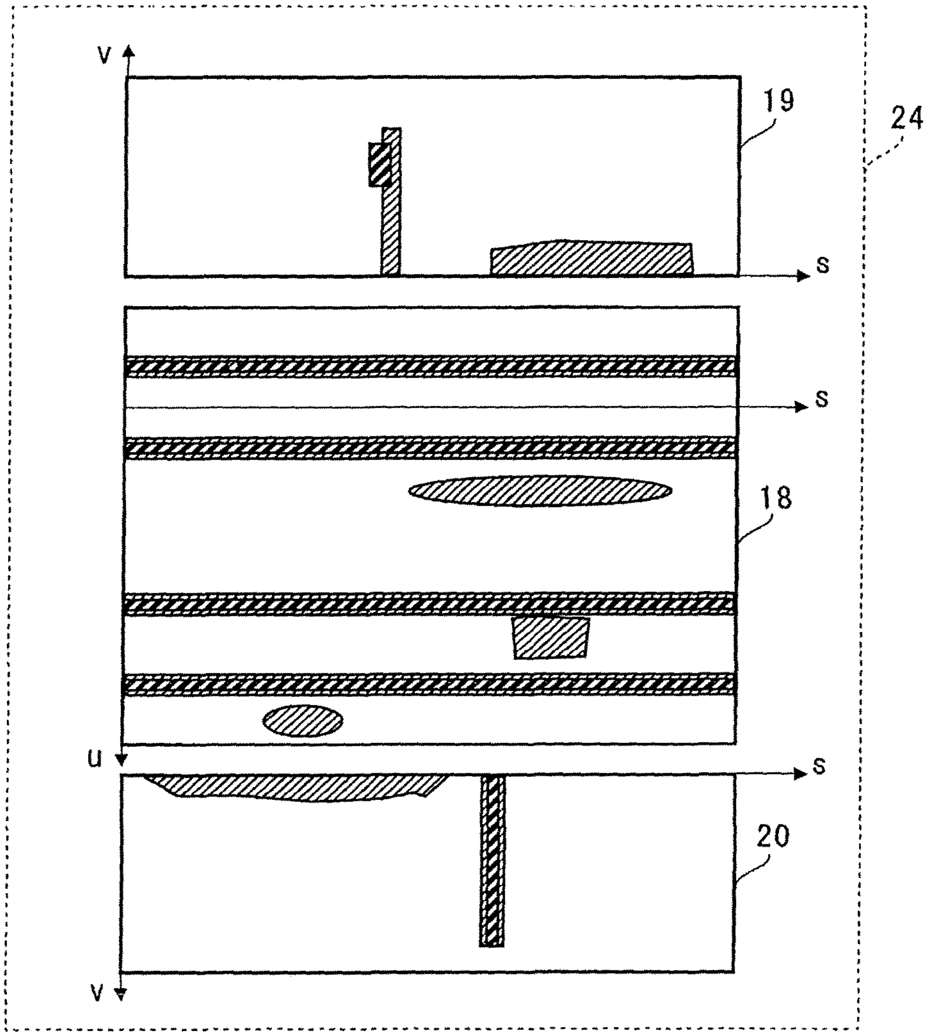
FIG. 18 is an explanatory diagram illustrating a configuration of a construction gauge measurement diagram according to the second embodiment of the present invention.

In the present embodiment, the drawing device 4 (FIG. 1) draws the measurement points 10 having the respective attributes of: on the ground, the left (of the track), and the right (of the track), as in the plan view 18, the left side view 19, and the right side view 20 (FIG. 18). Although the details will be described later, the drawing device 4 refers to the identification results of the measurement point 10 by the identification device 3, and draws it at ($S_k$, $u_{Lk}$) in the plan view 18 if it is the feature 29 on the ground. If it is on the left side of the track, it is drawn at ($S_k$, $v_{Lk}$) in the left side view 19. If it is on the right side of the track, it is drawn at ($S_k$, $v_{Lk}$) in the right side view 20. It should be noted that, here, the value of each vertical axis preferentially takes the uv coordinate value with respect to the left track 12 (FIG. 17). That is, the above values $u_{Lk}$ and $v_{Lk}$ are the coordinates of the measurement point $P_k$ in the $u_Lv_L$ coordinate system (FIG. 17).

(Method for Creating Construction Gauge Measurement Diagram)

Although the method for creating a construction gauge measurement diagram of the present embodiment has the same basic configuration as that of the first embodiment (FIG. 13), there is a difference in the configuration of each portion. In the following, this difference will be mainly described.

With reference to FIG. 20, the operation performed by the distance measurement device 2 in step ST1 (FIG. 13) will be described in detail below. It should be noted that the description of the same portions as in the first embodiment (FIG. 14) will be omitted.

In step ST200, the distance measurement device 2 reads the data of the k-th measurement point $P_k$ among the measurement point data 7 in the storage device 1 (FIG. 1). Then, the track nearest point 15 to the track 12 on the left side is obtained (see FIG. 7), and the mileage of the track nearest point 15 is set as the mileage $S_k$ of the measurement point $P_k$.

In step ST201, the $u_Lv_L$ coordinate values ($u_{Lk}$, $v_{Lk}$) of the left track is calculated from the coordinate values ($x_k$, $y_k$, $z_k$) of the measurement point $P_k$.

In step ST202, the distance $D_{Lk}$ between the measurement point 10 and the construction gauge 9 in the $u_Lv_L$ coordinate plane, and the nearest point $H_{Lk}$ giving the distance (FIG. 19: closest approach point 16) are obtained. When the measurement point 10 falls within the construction gauge 9, the sign of the distance $D_{Lk}$ is set as negative.

In step ST204, the $u_Rv_R$ coordinate values ($u_{Rk}$, $v_{Rk}$) with reference to the right track is calculated from the coordinate values ($x_k$, $y_k$, $z_k$) of the measurement point $P_k$. It should be noted that the left track may be a reference instead.

In step ST205, the distance $D_{Rk}$ between the measurement point 10 and the construction gauge 9 in the $u_Rv_R$ coordinate plane, and the nearest point $H_{Rk}$ giving the distance are obtained. When the measurement point 10 falls within the construction gauge 9, the sign of the distance $D_{Rk}$ is set as negative.

In step ST206, whether or not the $D_{Lk}$ is the $D_{Rk}$ or less is determined. If so, then the process proceeds to step ST207, otherwise, the process proceeds to step ST208.

In step ST207, the $D_{Lk}$ is set as the distance $D_k$, and the left nearest point $H_{Lk}$ is set as the nearest point $H_k$. In addition, the variable $G_k$, indicating which of the left and the right construction gauges the closest approach is made to, is set to the numeric value representing the left, for example, 0.

In step ST208, the $D_{Rk}$ is set as the distance $D_k$, and the right nearest point $H_{Rk}$ is set as the nearest point $H_k$. In addition, the variable $G_k$ is set to the numeric value representing the right, for example, 1.

In step ST209, the mileage $S_k$, the distance $D_k$, and the nearest point $H_k$ are stored in the storage device 1. In addition, ($u_{Lk}$, $v_{Lk}$) is stored in the storage device 1 as ($u_k$, $v_k$).

Figure 21:
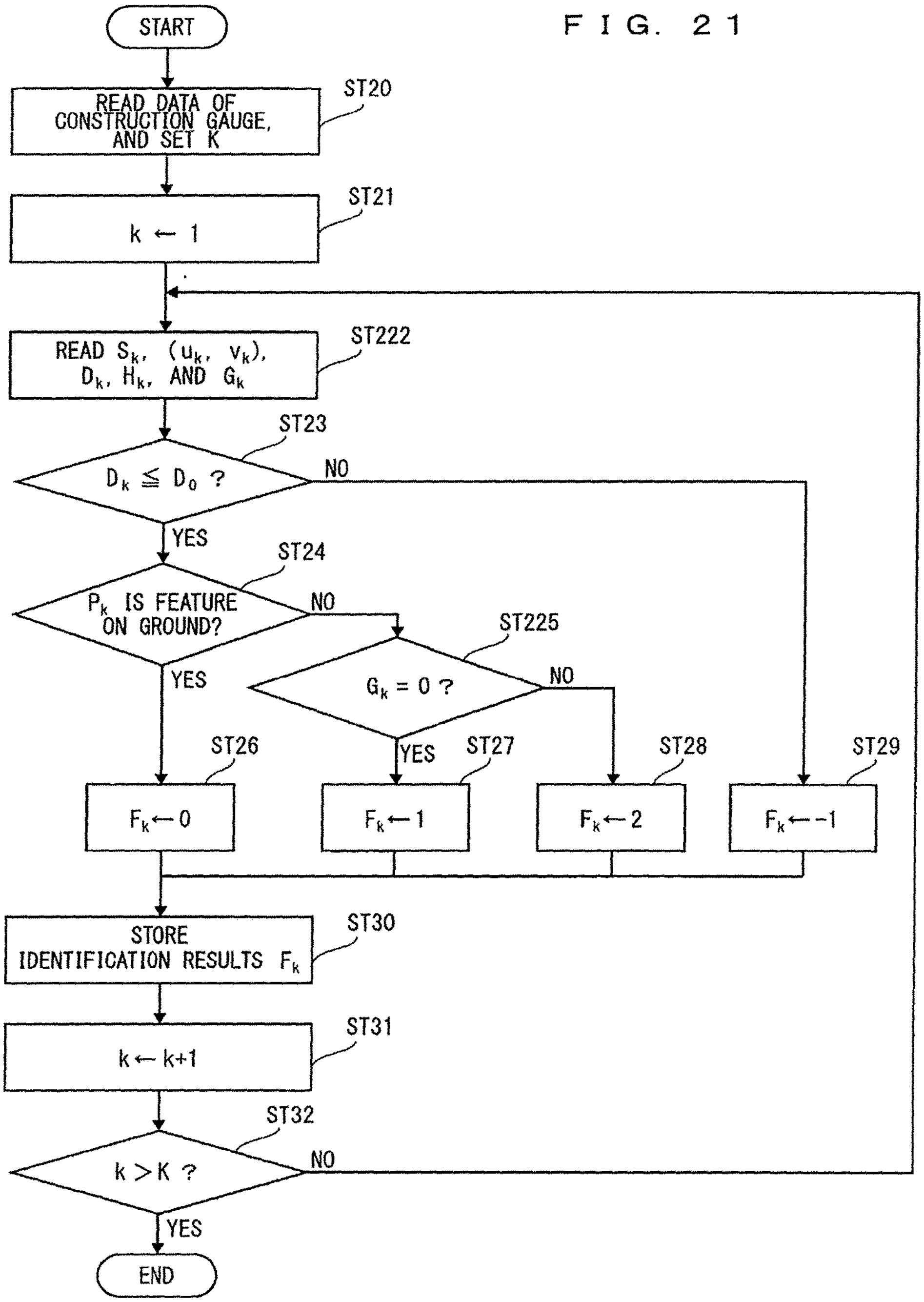
FIG. 21 is a flowchart illustrating the operation of the identification device in the method for creating a construction gauge measurement diagram according to the second embodiment of the present invention.

With reference to FIG. 21, the operation performed by the identification device 3 in step ST2 (FIG. 13) will be described in detail below. It should be noted that the description of the same portions as in the first embodiment (FIG. 15) will be omitted.

In step ST222, the mileage of the measurement point $P_k$, ($u_k$, $v_k$), the distance $D_k$, the nearest point $H_k$, and the variable $G_k$ are read from the storage device 1.

In step ST225, the identification device 3 identifies whether or not the measurement point $P_k$ is on the left of the track. Specifically, whether or not the variable $G_k$ is 1 indicating the left is determined. If so, then the process proceeds to step ST27, otherwise, the process proceeds to step ST28.

Next, the construction gauge measurement diagram 24 in the double track section (FIG. 18) with the plan view 18, the left side view 19, and the right side view 20 as one set can be obtained by the operation performed by the drawing device 4 in step ST3 (FIG. 13).

According to the present embodiment, there can be obtained the construction gauge measurement diagram 24 in which the distances to each of the construction gauges 9 are integrated in the section where the two tracks 12 run side by side. In this way, the construction gauge measurement diagram 24 integrated for the double track can be obtained, and therefore, for example, the measurement results of the construction gauge over the entire route for both tracks of up and down can be concisely represented in one set of construction gauge measurement diagram 24, and can be easily understood.

It should be noted that although in the above embodiment, the double track section where two tracks run side by side is described, the section where three or more tracks run side by side can also be performed in the same manner. In addition, although in the above embodiment, the construction gauge measurement diagram 24 for the left and right tracks in the double track section is configured to be represented by a single plan view 18, a left side view 19, and a right side view 20, each of the construction gauge measurement diagrams may be created by individually handling the left and right tracks in the same manner as the construction gauge measurement diagram 24 in the first embodiment (FIG. 11).

<Third Embodiment>

In the first embodiment, the feature 30 along the track (FIG. 12) approaching or entering the construction gauge 9 is drawn by being divided into the left side view 19 and the right side view 20 (FIG. 11); however, the feature 30 is drawn in one side view in the present embodiment. Therefore, in order that it is not unclear which of the left side and the right side of the track the feature 30 is located on, in the present embodiment, the drawing device 4 (FIG. 1) draws, by using different symbols, the measurement point identified to be located on the left side and the measurement point identified to be located on the right side by the left-right identification unit 3c (FIG. 1) among the measurement points.

Figure 22:
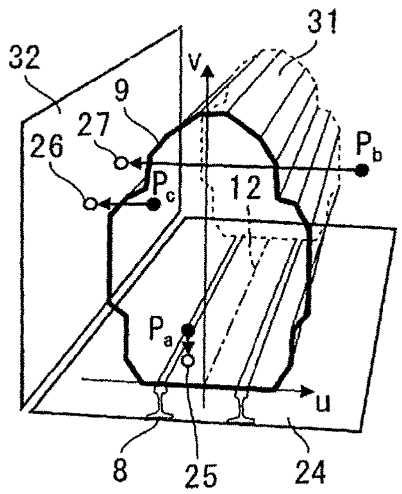
FIG. 22 is an explanatory diagram illustrating operation of a drawing device included in a device for creating a construction gauge measurement diagram according to a third embodiment of the present invention.
Figure 23:
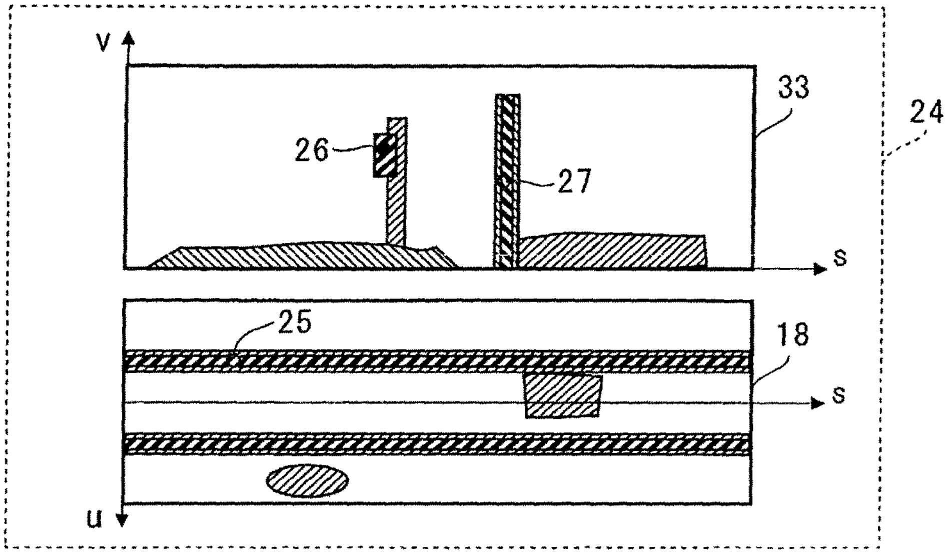
FIG. 23 is an explanatory diagram illustrating a configuration of a construction gauge measurement diagram according to the third embodiment of the present invention.

FIG. 22 is an explanatory diagram illustrating the operation of the drawing device 4 (FIG. 1) included in the device for creating a construction gauge measurement diagram 24 (FIG. 23) according to the present embodiment. In the present embodiment, the drawing device 4 draws the measurement points $P_a$ and $P_b$ (FIG. 22) of the features on the left and right of the track 12 as the side view 33 (FIG. 23) projected on one projection surface 32. At that time, in order to indicate which of the left and right of the track 12 the point 26 drawn in the side view 33 is on, the color, the shade, or the size of the point for drawing is changed depending on the u coordinate value. In the side view 33 of the construction gauge measurement diagram 24 (FIG. 23), which of the left side and right side of the track 12 (FIG. 22) the measurement point is located on, and whether the measurement point enters or approaches the construction gauge 9 are represented by changing the hatching. Specifically, the measurement point on the right side of the track 12 is represented by the right-downward diagonal hatching, and the measurement point on the left side of the track 12 is represented by the left-downward diagonal hatching.

Although the method for creating a construction gauge measurement diagram of the present embodiment has the same basic configuration as that of the first embodiment (FIG. 13), there is a difference in the configuration of each portion. In the following, this difference will be mainly described.

Figure 24:
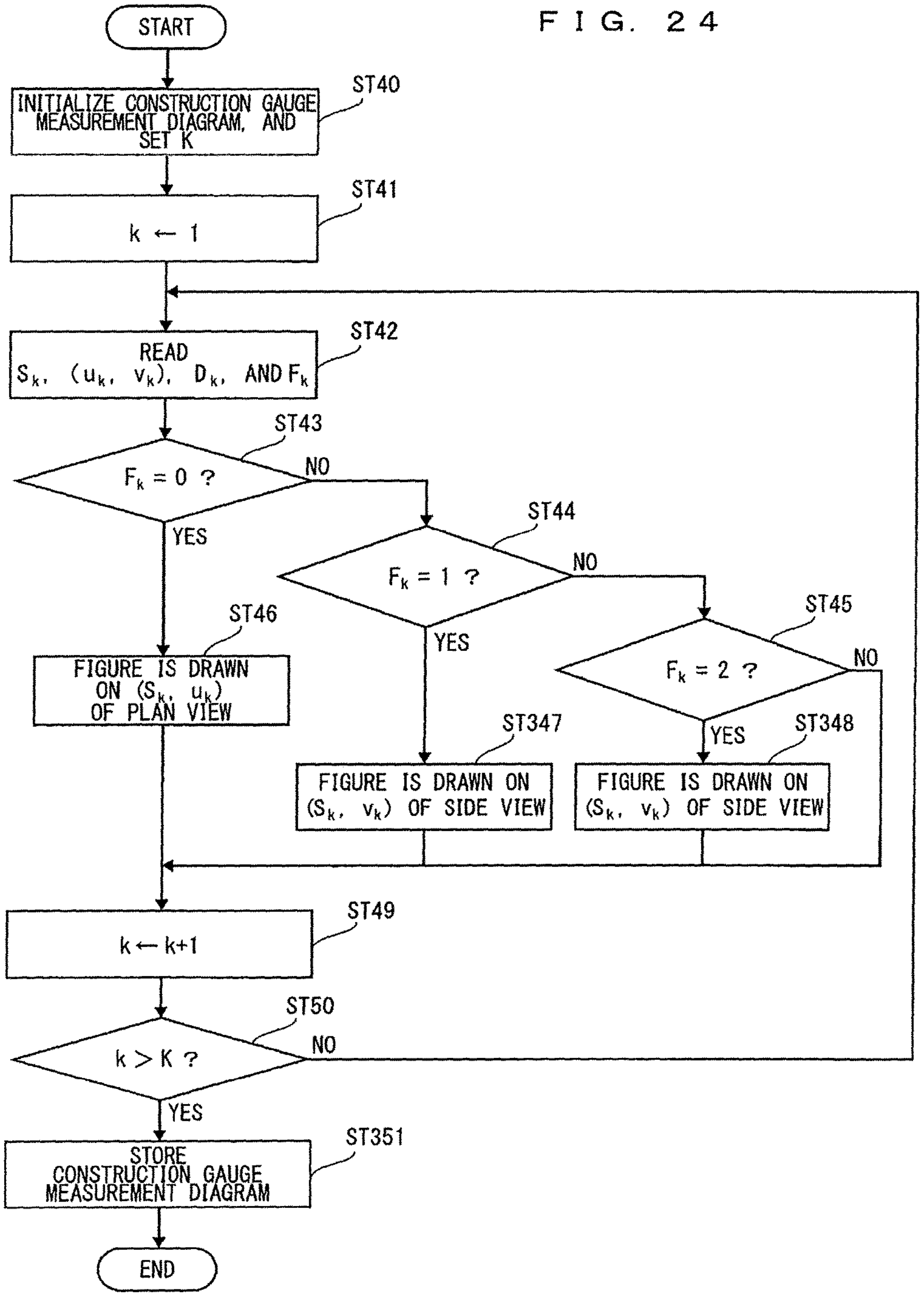
FIG. 24 is a flowchart illustrating the operation of the drawing device in a method for creating a construction gauge measurement diagram according to the third embodiment of the present invention.

With reference to FIG. 24, the operation performed by the drawing device 4 in step ST3 (FIG. 13) will be described. Step ST3 in the present embodiment is obtained by respectively replacing steps ST47, ST48, and ST51 in the first embodiment (FIG. 16) with steps ST347, ST348, and ST351.

In step ST347, the drawing device 4 draws the point 26 at ($S_k$, $v_k$) in the side view 33 in a form indicating that the measurement point $P_k$ is on the left side of the track. In step ST348, the point 26 is drawn at ($S_k$, $v_k$) in the side view 33 in a form indicating that the measurement point $P_k$ is on the right side of the track. In these steps ST347 and ST348, the form such as the size and the color of the drawing point 26 may be changed depending on whether the measurement point $P_k$ enters or approaches the construction gauge 9 as described above, in addition to the distinction in the left and right. In addition, the drawing of the point falling within the construction gauge 9 may be prioritized to be in the front, and, for example, the color for the measurement point on the right side of the track may be prioritized to be in the front.

In step ST351, the drawing device 4 stores the plan view 18 and the side view 33 in the storage device 1 as one set of the construction gauge measurement diagram 24. Thus, the construction gauge measurement diagram 24 (FIG. 23) is obtained. It should be noted that the configuration other than the above is about the same as the configuration in the first embodiment described above, and therefore the same or corresponding elements will be denoted by the same reference numerals, and the description thereof will not be repeated.

According to the present embodiment, both measurement points 10 on the left side and the right side of the track 12 can be displayed in one side view 33 while being distinguished from each other. For this reason, the measurement results of the construction gauge over the entire route can be represented by two drawings of the plan view 18 and the side view 33, and can be understood. That is, a more condensed construction gauge measurement diagram 24 can be obtained.

<Fourth Embodiment>

Although in the above third embodiment (FIG. 24), the construction gauge measurement diagram 24 is configured by one plan view 18 and one side view 33, in the present embodiment, the construction gauge measurement diagram is configured by only a plan view. The device for creating a construction gauge measurement diagram of the present embodiment has the same basic configuration as that of the first embodiment (FIG. 1). In the present embodiment, as for the drawing device 4 (FIG. 1), all of the measurement points entering or approaching the construction gauge 9 among the measurement points 10 (FIG. 2) are drawn in the plan view 18 (FIG. 26), and the side view is not created. In the plan view 18, the measurement point of the feature is drawn irrespective of whether the feature is on the ground or not.

In the example illustrated in FIG. 25, the drawing device 4 (FIG. 1) draws each of the measurement point $P_a$ of a feature on the ground, the measurement point $P_b$ on the right side of the track 12, and the measurement point $P_c$ on the left side in the plan view 18 by projecting it onto the projection surface 21 on the ground. At that time, in order to show whether the drawn point is that of the feature on the ground, the form such as the color, the shade, or the size of the point at the time of the drawing is changed depending on the identification results in the identification device 3 (FIG. 1) of the measurement point 10 and the z coordinate value or the v coordinate value being the height.

That is, the construction gauge measurement diagram 24 includes drawing of the symbols representing those of the features on the ground among a plurality of measurement points and drawing of the symbols representing those not of the features on the ground among the plurality of measurement points. The symbols representing the features on the ground among a plurality of measurement points and the symbols representing those not of the features on the ground among the plurality of measurement points are different from each other.

In the construction gauge measurement diagram 24 (FIG. 26), the drawing form is changed depending on the v coordinate value of the measurement point and the classification whether the measurement point approaches or enters the construction gauge 9. FIG. 26 schematically shows this by changing the hatching. Specifically, the measurement point not of the feature on the ground is indicated by the right-downward diagonal hatching, the thickness is changed depending on its height, and the measurement point falling within the construction gauge 9 are represented by being filled. It should be noted that the construction gauge measurement diagram 24 may be a diagram in which only the measurement point falling in a predetermined range from the construction gauge among the measurement points is drawn.

Although the method for creating a construction gauge measurement diagram of the present embodiment has the same basic configuration as that of the first embodiment (FIG. 13), there is a difference in the configuration of each portion. In the following, this difference will be mainly described.

Figure 27:
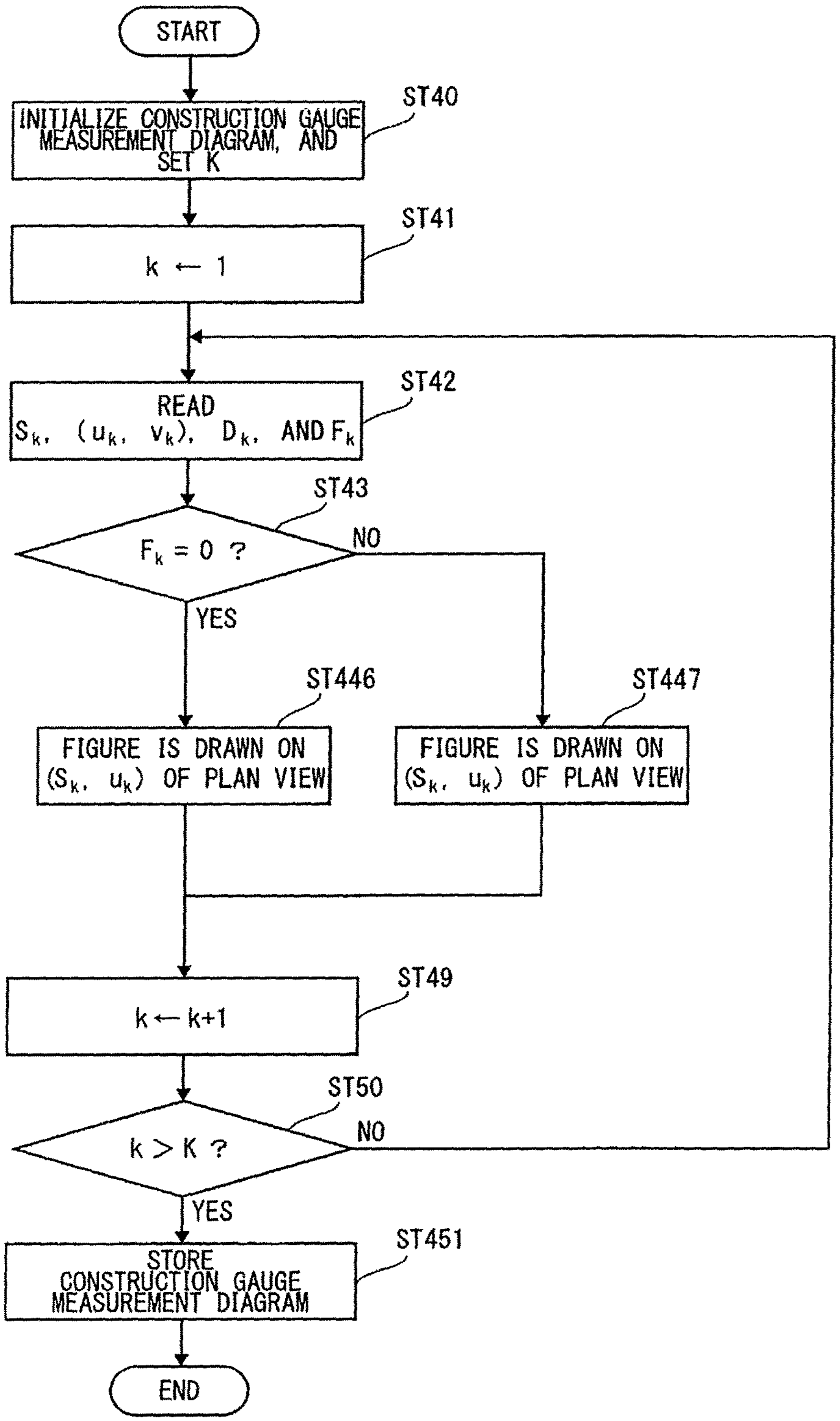
FIG. 27 is a flowchart illustrating the operation of the drawing device in a method for creating a construction gauge measurement diagram according to the fourth embodiment of the present invention.

With reference to FIG. 27, the operation performed by the drawing device 4 (FIG. 1) in step ST3 (FIG. 13) will be described. Step ST3 in the present embodiment is obtained by replacing steps ST46 to ST48 in the first embodiment (FIG. 16) with steps ST446 and ST447, and step ST51 with step ST451.

In step ST446, in terms of the measurement point $P_k$, the drawing device 4 draws the point 25 (FIG. 25) at ($S_k$, $u_k$) in the plan view 18 in a form indicating the feature on the ground.

In step ST447, in terms of the measurement point $P_k$, the drawing device 4 draws the points 26 and 27 (FIG. 25) at ($S_k$, $u_k$) in the plan view 18 in a form indicating the left and the right of the track 12. The form of the size and the color of the drawing point 25 is changed depending on whether the measurement point $P_k$ enters or approaches the construction gauge 9. In addition, the drawing point of the measurement point falling within the construction gauge 9 may be prioritized to be in the front, and the drawing with respect to the measurement point on the left and the right of the track may be prioritized to be in the front.

In step ST451, the plan view 18 (FIG. 26) is stored in the storage device 1 as the construction gauge measurement diagram 24. Thus, the construction gauge measurement diagram 24 is obtained.

According to the present embodiment, the construction gauge measurement results over a wide area can be condensed into a plan view. In addition, by using different symbols for drawing the measurement points 10 (FIG. 2) in the plan view 18 (FIG. 26), whether the measurement points 10 are those of the features on the ground or not can be grasped from the construction gauge measurement diagram 24 (FIG. 26). Therefore, the feature can be easily identified on-site.

<Fifth Embodiment>

In the construction gauge measurement diagram 24 (FIG. 11) of the first embodiment, the measurement point of the feature on the ground which is apt to approach or enter the base of the construction gauge is drawn in the plan view 18, and all of the measurement points of the other features are drawn in side views. As another feature other than the feature on the ground, the feature 30 (FIG. 12) installed along the track is typically present as mentioned in the first embodiment; however, in addition to this, the feature which is installed above the track 12 and the construction gauge 9 and apt to approach or enter the upper portion of the construction gauge 9 (also referred to as "feature of the upper portion") may be present. For example, an overhead wire, an elevated bridge, or the like corresponds to this. The present embodiment is suitable in such a case, and in addition to the plan view in which the feature on the ground is drawn, the top plan view 35 in which the feature of the upper portion is drawn (FIG. 29) is further used.

Although the device for creating a construction gauge measurement diagram of the present embodiment has the same basic configuration as that of the first embodiment (FIG. 1), there is a difference in the configuration of each portion. In the following, this difference will be mainly described with reference to FIG. 28.

Figure 28:
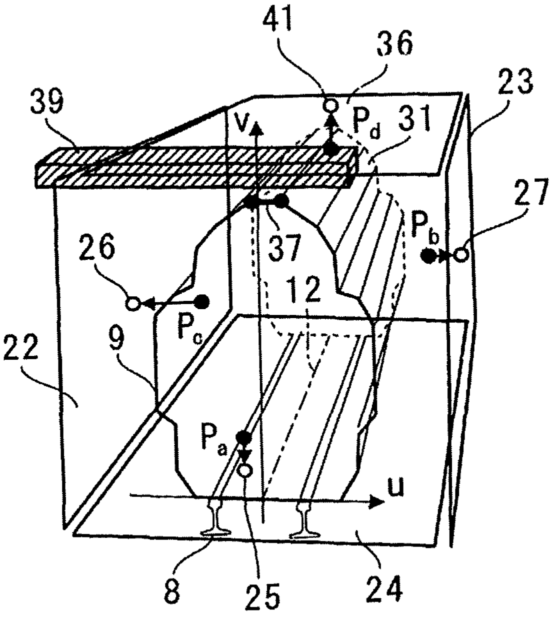
FIG. 28 is an explanatory diagram illustrating operation of an identification device and a drawing device included in a device for creating a construction gauge measurement diagram according to a fifth embodiment of the present invention.

In the present embodiment, the identification device 3 (FIG. 1) includes an upper portion feature identification unit (not shown), in addition to the range identification unit 3*a*, the ground feature identification unit 3*b*, and the left-right identification unit 3*c*. The upper portion feature identification unit identifies whether or not the measurement point 10 (FIG. 2) is that of the feature 39 of the upper portion (FIG. 28). This identification can be performed by the principle, for example, similar to the principle of the identification by the ground feature identification unit 3*b*. Specifically, when the nearest point $H_k$ (see FIG. 8) of the measurement point $P_k$ is placed on the top side 37 (FIG. 28) defined in the construction gauge 9, or when $v_k$ of the measurement point is $v_t$ (FIG. 12) being the height of the loading gauge 40 (FIG. 12) or more, this measurement point is identified as that of the feature 39 of the upper portion.

It should be noted that, although the details will be described later, the upper portion feature identification unit may be considered to perform the identification on each of the measurement points at least identified as falling within a predetermined range from the construction gauge 9 by the range identification unit 3*a* among the measurement points 10 (FIG. 2).

In the drawing device 4 (FIG. 1), in the present embodiment, the measurement point approaching or entering the construction gauge 9 and identified to be the measurement point of the feature 39 of the upper portion is drawn in the top plan view 35 (FIG. 29). The top plan view 35 is obtained by the projection of the feature 39 of the upper portion of the track on the projection surface 36 provided above the track 12. In the upper portion of the construction gauge 9, the measurement points 10 approaching or entering it can be widely distributed in the transverse direction of the track 12. Therefore, which positions in the u-axis direction the measurement points 10 are in or how wide a range they are distributed is not known, if the measurement points of the features of the upper portion are drawn in the side view. In the present embodiment, these are drawn in the top plan view 35, whereby the position and the spread in the u-axis direction of the measurement points can be easily understood.

The construction gauge measurement diagram 24 (FIG. 29) includes, in order from the top, the top plan view 35, the left side view 19, the plan view 18, and the right side view 20. The horizontal axis s of each of the figures is intended to correspond to the mileage of the track 12, and matches each other. The u coordinate value is made to upwardly correspond to the vertical axis of the top plan view 35. With this arrangement, the construction gauge measurement diagram 24 can be obtained by the projection surfaces 22 to 24 and 36 (FIG. 28) being developed, and therefore the understanding of the construction gauge measurement diagram 24 becomes easier.

Although the method for creating a construction gauge measurement diagram (FIG. 29) of the present embodiment has the same basic configuration as that of the first embodiment (FIG. 13), there is a difference in the configuration of each portion. In the following, this difference will be mainly described.

Figure 30:
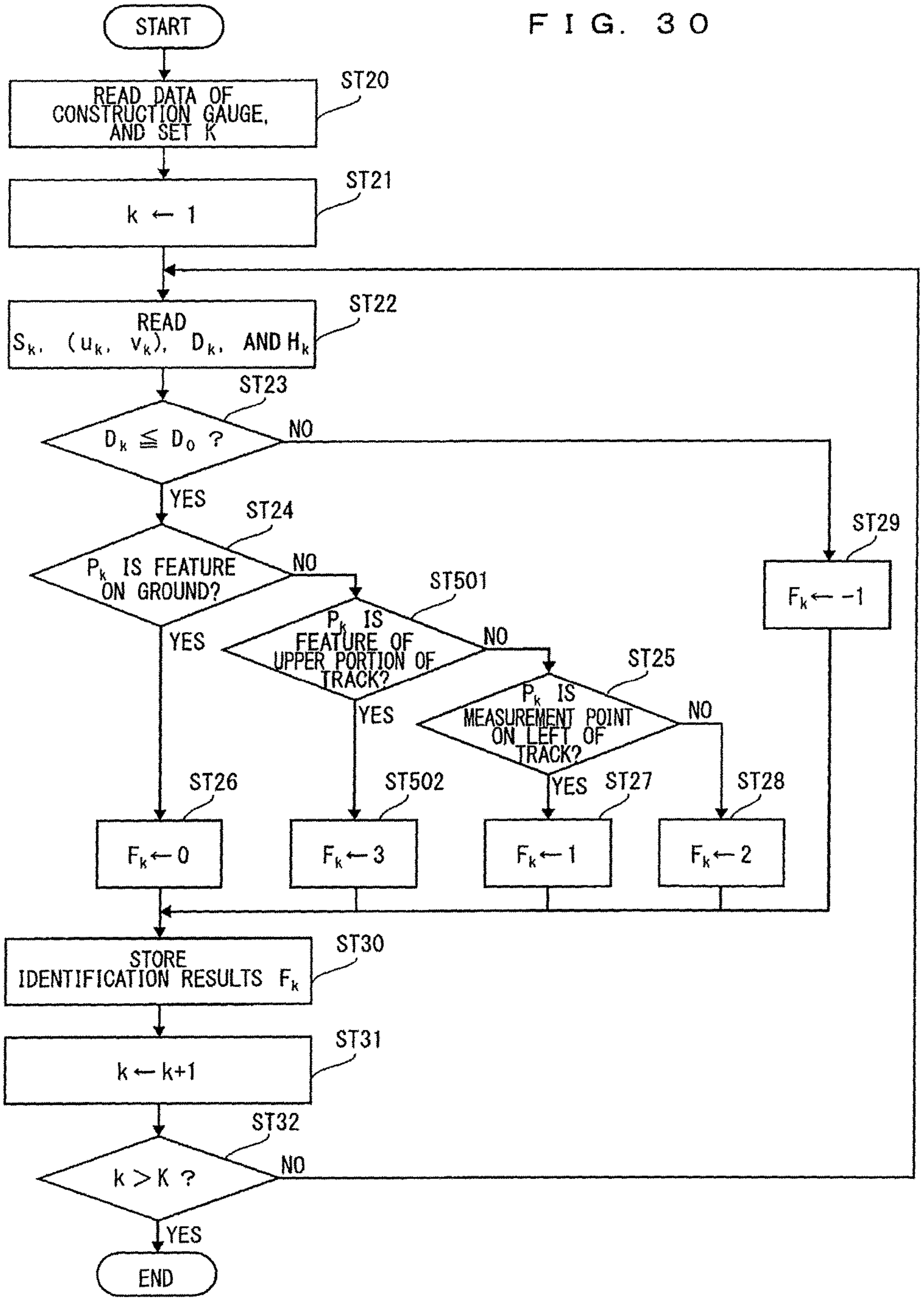
FIG. 30 is a flowchart illustrating the operation of the identification device in a method for creating a construction gauge measurement diagram according to the fifth embodiment of the present invention.

With reference to FIG. 30, the operation performed by the identification device 3 (FIG. 1) in step ST2 (FIG. 13) will be described. Step ST2 in the present embodiment further includes steps ST501 and ST502 in addition to those of the first embodiment (FIG. 15).

In step ST501, whether or not the measurement point $P_k$ is that of the feature 39 of the upper portion is identified. This can be identified depending on whether the nearest point $H_k$ is on the top side 37 of the construction gauge 9 as described above. If so, then the process proceeds to step ST502, otherwise, the process proceeds to step ST25.

In step ST502, in response to the measurement point $P_k$ being identified as the feature 39 of the upper portion, the variable $F_k$ indicating the identification result is set to "3" representing the feature 39 of the upper portion.

Figure 31:
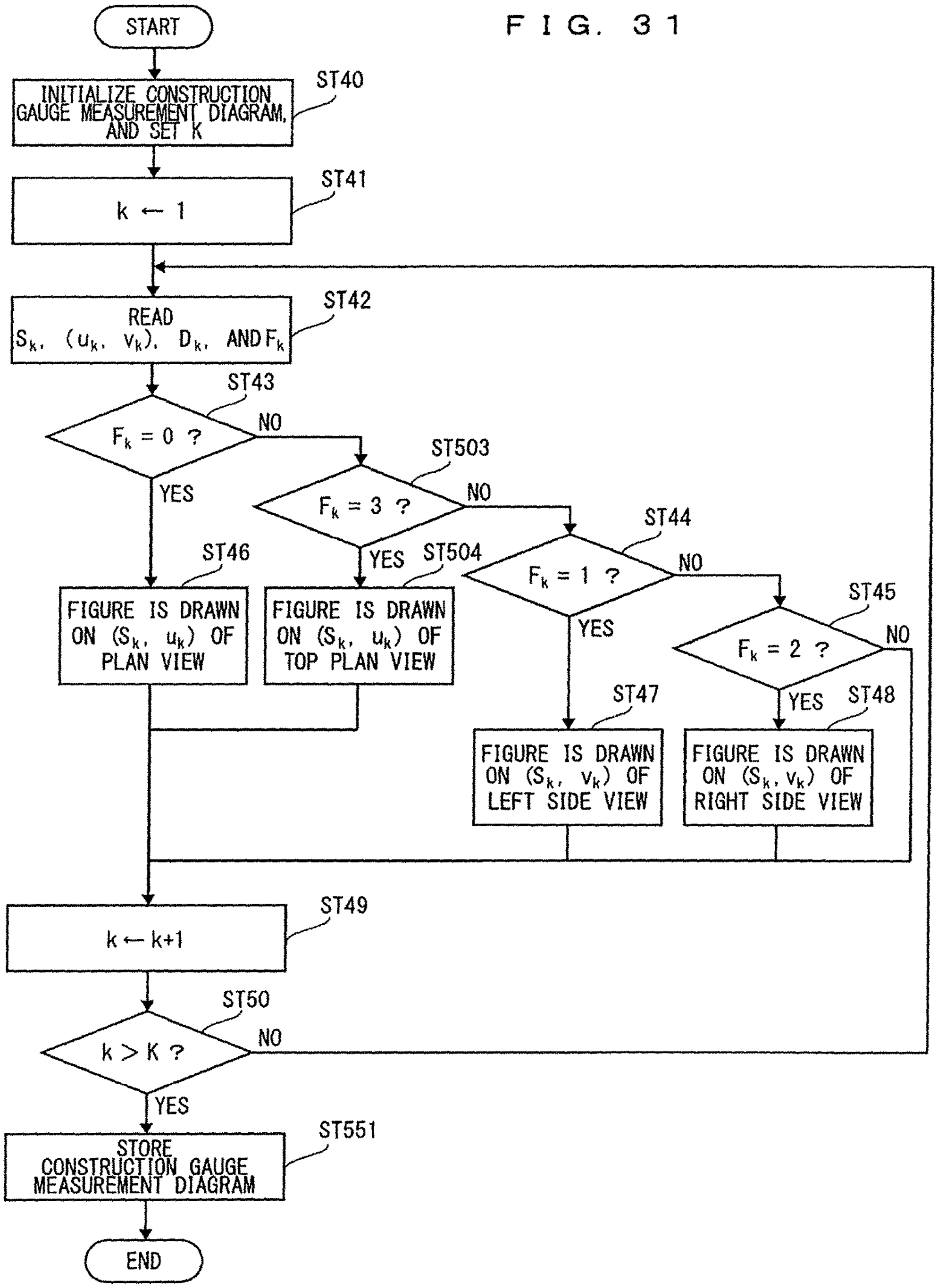
FIG. 31 is a flowchart illustrating the operation of the drawing device in the method for creating a construction gauge measurement diagram according to the fifth embodiment of the present invention.

With reference to FIG. 31, the operation performed by the drawing device 4 (FIG. 1) in step ST3 (FIG. 13) will be described. Step ST3 in the present embodiment is obtained by adding steps ST503 and 504 to those of the first embodiment (FIG. 16) and replacing step ST51 with step ST551.

In step ST503, the drawing device 4 determines whether or not the k-th measurement point $P_k$ is identified as the feature of the upper portion. If it is identified so, the process proceeds to step ST504, otherwise, the process proceeds to step ST44.

In step ST504, in terms of the measurement point $P_k$, a point 41 is drawn at $(S_k, u_k)$ of the top plan view 35 (FIG. 29). Also in the step ST504, as described above, the form of the size and color of the drawing of the point 41 is changed depending on whether the measurement point $P_k$ enters or approaches the construction gauge 9. In addition, the drawing of the measurement point falling within the construction gauge 9 is preferentially represented at the front.

In step ST551, the plan view 18, the top plan view 35, the left side view 19, and the right side view 20 are stored in the storage device 1 as one set of the construction gauge measurement diagram 24. Thus, the construction gauge measurement diagram 24 is obtained.

According to the present embodiment, a planar position of not only the feature on the ground, but also the feature of the upper portion of the track, can be grasped from the construction gauge measurement diagram 24. As a result, the position and the spread in the transverse direction of the track 12 can be represented for not only the feature on the ground, but also for the feature of the upper portion of the track.

<Sixth Embodiment>

In the present embodiment, the case where the route of the track includes a section passing through a tunnel will be described. Although in the first embodiment, the measurement point of the feature other than the feature on the ground is represented in the side view, in the present embodiment, in the tunnel section, the measurement point of the feature other than the feature on the ground is represented in the tunnel development view.

Although the device for creating a construction gauge measurement diagram of the present embodiment has the same basic configuration as that of the first embodiment (FIG. 1), there is a difference in the configuration of each portion. In the following, this difference will be mainly described with reference to FIG. 32.

In the storage device 1 (FIG. 1), as the track data 5, not only those described in the first embodiment, but also the data of a curve 50 indicating the tunnel cross-sectional shape is stored. It should be noted that although the identification device 3 (FIG. 1) is substantially the same as that of the first embodiment, when only the section passing through the tunnel among the routes is handled, the left-right identification unit 3*c* can be omitted.

Figure 32:
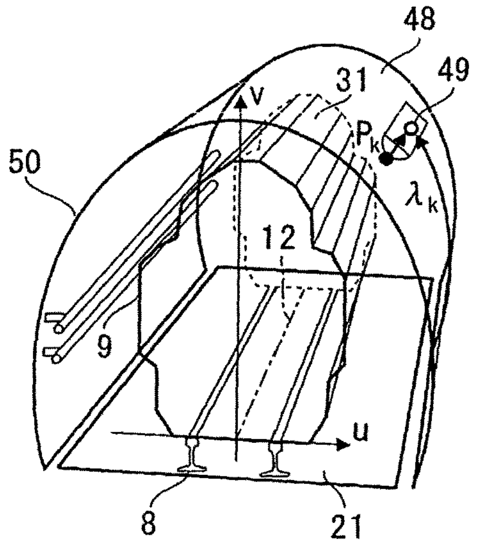
FIG. 32 is an explanatory diagram illustrating operation of a device for creating a construction gauge measurement diagram according to a sixth embodiment of the present invention.
Figure 33:
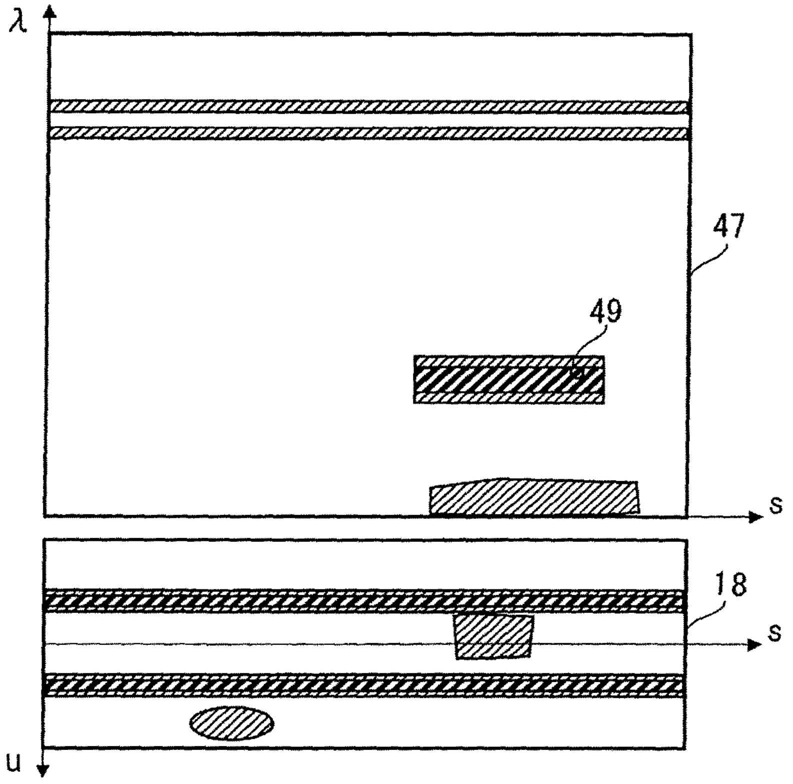
FIG. 33 is an explanatory diagram illustrating a configuration of a construction gauge measurement diagram according to the sixth embodiment of the present invention.

In the present embodiment, the drawing device 4 draws the measurement point approaching or entering the construction gauge 9 in the tunnel in a development view 47 of the tunnel (FIG. 33). The development view 47 plots the situations of each point on the inner wall with the horizontal axis as the length in the longitudinal direction and the vertical axis as the length along the cross section of the tunnel, in a tunnel inner wall surface 48. In the present embodiment, for the measurement point $P_k$ approaching or entering the construction gauge 9, a point 49 projected onto the tunnel inner wall surface 48 is considered, and this point is drawn in the development view 47. In FIG. 32, the length along the curve 50 of the cross section is set as $\lambda_k$. The tunnel inner wall surface 48 is the surface obtained by the sweeping of the curve 50 representing the tunnel cross section in the axis direction of the tunnel. The projected point 49 of the measurement point $P_k$ is set as the point giving the shortest distance from the measurement point $P_k$ onto the tunnel inner wall surface 48.

The construction gauge measurement diagram (FIG. 33) includes, in order from the top, the development view 47 and the plan view 18. Here, the horizontal axis takes the mileage s also in the development view 47. The vertical axis indicates the length $\lambda$ (for example, $\lambda_k$ in FIG. 32) along the cross section of the projected point 49. It should be noted that the development view 47 of the tunnel is drawn as viewed from above the tunnel, and therefore the length along the cross section is obtained by the measurement from the end point on the right side.

Although the method for creating a construction gauge measurement diagram (FIG. 33) of the present embodiment has the same basic configuration as that of the first embodiment (FIG. 13), there is a difference in the configuration of each portion. In the following, this difference will be mainly described.

Figure 34:
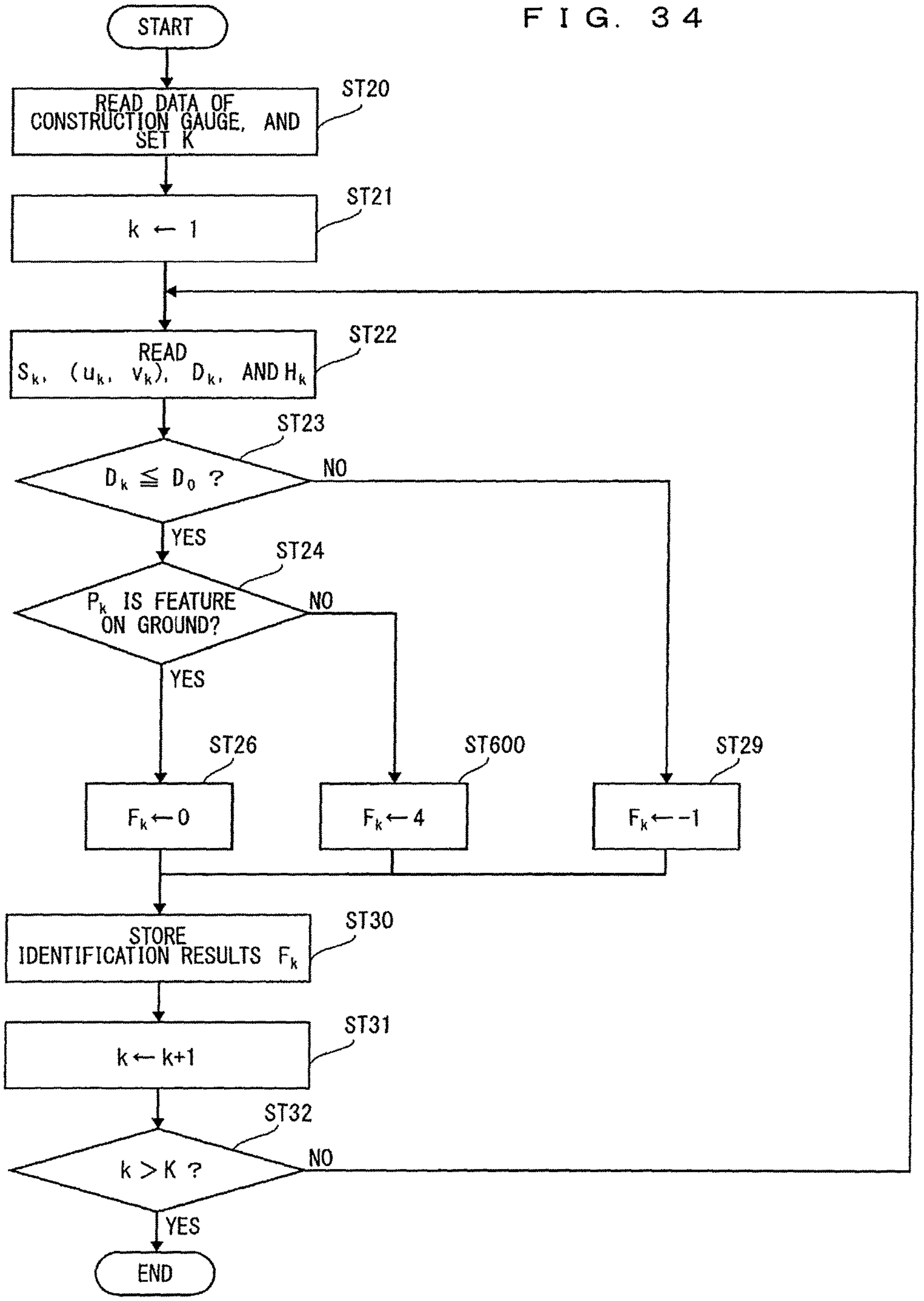
FIG. 34 is a flowchart illustrating operation of an identification device in a method for creating a construction gauge measurement diagram according to the sixth embodiment of the present invention.

With reference to FIG. 34, the operation performed by the identification device 3 (FIG. 1) in step ST2 (FIG. 13) will be described. Step ST2 in the present embodiment is obtained by omitting steps ST25, ST27, and ST28 from those of the first embodiment (FIG. 15), and adding step ST600. Step ST600 is executed if the measurement point $P_k$ is identified as not the measurement point of the feature on the ground in step ST24, and the variable $F_k$ is set to "4".

With reference to FIG. 35, the operation performed by the drawing device 4 (FIG. 1) in step ST3 (FIG. 13) will be described. Step ST3 in the present embodiment is obtained by omitting steps ST44, ST45, ST47, and ST48 from those of the first embodiment (FIG. 16), adding steps ST601 and ST602, and replacing step ST51 with step ST651.

In step ST601, the drawing device 4 determines whether the variable $F_k=4$ is satisfied for the k-th measurement point $P_k$. If it is satisfied, the process proceeds to step ST602, otherwise, the process proceeds to step ST49.

In step ST602, the drawing device 4 draws a point at $(S_k, \lambda_k)$ of the development view 47 as the measurement point $P_k$. In step ST602, as described above, the form of the size and the color of the drawing point is changed depending on whether the measurement point $P_k$ enters or approaches the construction gauge 9. In addition, the drawing of the point entering the construction gauge 9 is set at the front.

In step ST651, as shown in FIG. 33, the plan view 18 and the development view 47 are stored in the storage device 1 as one set of the construction gauge measurement diagram. Thus, the construction gauge measurement diagram is obtained.

According to the present embodiment, the construction gauge measurement results over a wide area can be condensed by using the plan view and the development view. The measurement point 10 of the feature on the ground is drawn in the plan view 18 (FIG. 33), whereby the position on the ground can be grasped from the plan view 18, and this allows the feature on the ground to be easily identified on-site. In addition, the measurement point 10 not of the feature on the ground is drawn in the development view 47, whereby the position in the tunnel inner surface can be grasped, and this allows the feature not on the ground to be easily identified on-site. Therefore, there can be obtained the construction gauge measurement diagram capable of condensedly displaying the measurement point 10 while maintaining particularly useful information for identifying in the on-site tunnel the position of the feature corresponding to the measurement point 10 entering or approaching the construction gauge 9.

In addition, there are cases where the development view is used even in the control chart for deformation such as the cracks in the tunnel, and in such a case, the comprehensive management of the tunnel can be performed by the combination of the development view of the control chart for deformation and the development view 47 (FIG. 33) of the construction gauge measurement diagram, or by using the figure obtained by combining both development views.

<Seventh Embodiment>

Although in each of the above embodiments, the construction gauge measurement diagram 24 is created as a single figure, this may be superimposed on the map along the track of the map.

Although the device for creating a construction gauge measurement diagram of the present embodiment has the same basic configuration as that of the first embodiment (FIG. 1), there is a difference in the configuration of each portion.

The storage device 1 stores a map 67 of the region including the route of the track (FIG. 36). When the construction gauge measurement diagram is created, the map data is stored in the storage device 1. The drawing device 4 draws the construction gauge measurement diagram 24 on the map 67.

In the present embodiment, the drawing device 4 draws the plan view 18, the left side view 19, and the right side view 20 constituting the construction gauge measurement diagram 24 along the track 42 drawn on the map 67. The construction gauge measurement diagram is drawn along the track 42 on the map 67 in accordance with the mileage, whereby the understanding of the point where the feature approaching or entering the construction gauge 9 is present and the environment of its surrounding can be facilitated.

In FIG. 36, the plan view 18, the left side view 19, and the right side view 20 are drawn as the continuous construction gauge measurement diagram 24. The s-axis of the construction gauge measurement diagram 24 is placed on the track 42. The t-axis is taken in a direction perpendicular to the s-axis at each point. The plan view 18 is placed in the center, and the drawing point 25 is drawn at $(s, t)=(S_k, -v_k)$. In order that each of the left side view 19 and the right side view 20 is drawn on both sides of the plan view 18, the maximum value of the absolute value of the u coordinate value of the construction gauge 9 is set as $U_0=\max\{|U_j|\}$, and each of the drawing points is drawn at $(S_k, v_k+U_0)$ in the left side view 19 and at $(S_k, -v_k-U_0)$ in the right side view 20.

Although the method for creating a construction gauge measurement diagram (FIG. 36) of the present embodiment has the same basic configuration as that of the first embodiment (FIG. 13), there is a difference in the configuration of each portion. In the following, this difference will be mainly described.

Figure 37:
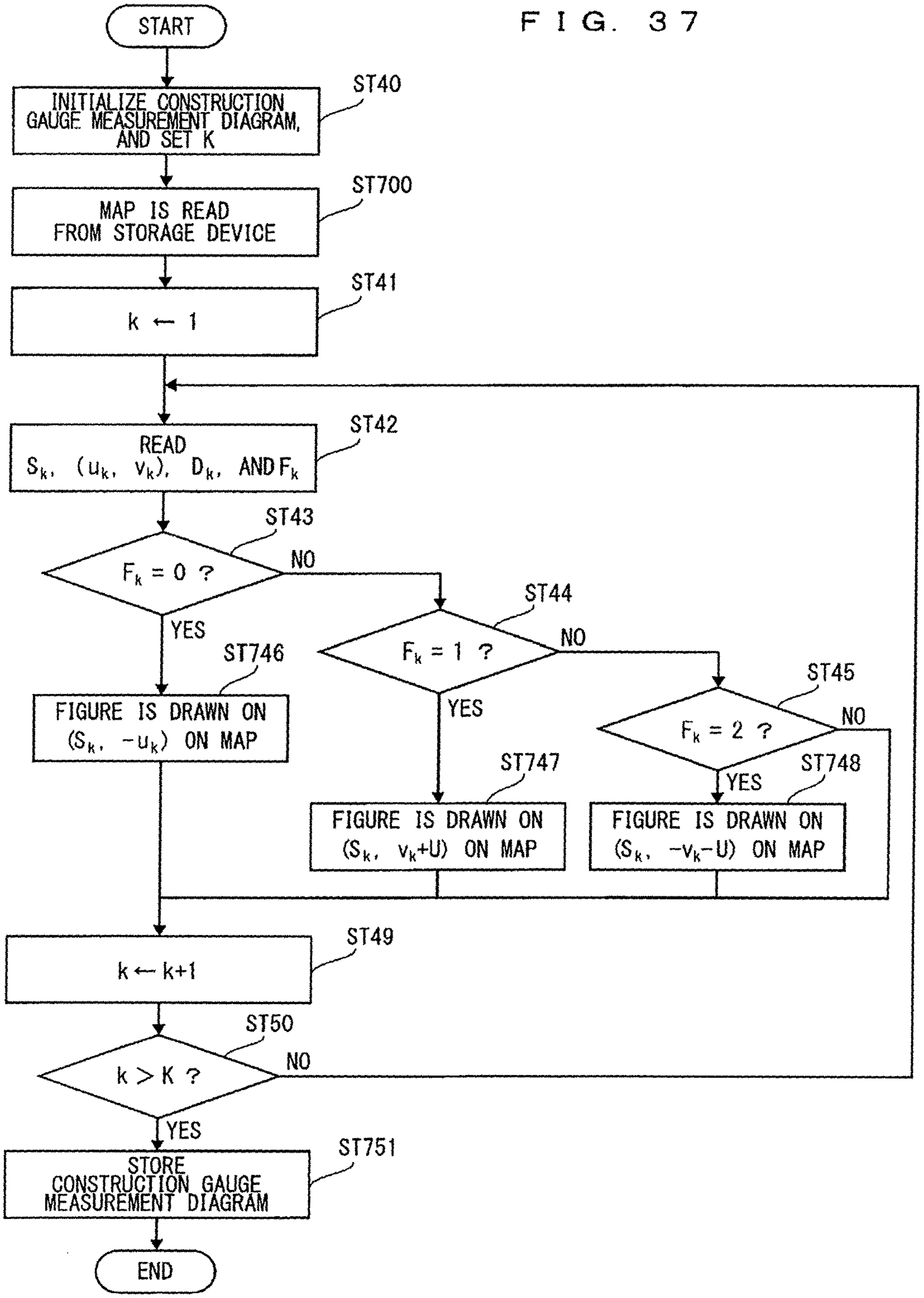
FIG. 37 is a flowchart illustrating operation of a drawing device in a method for creating a construction gauge measurement diagram according to the seventh embodiment of the present invention.

With reference to FIG. 37, the operation performed by the drawing device 4 (FIG. 1) in step ST3 (FIG. 13) will be described. Step ST3 in the present embodiment is obtained by adding step ST700 to those of the first embodiment (FIG. 16), and respectively replacing steps ST46 to ST48 and ST51 with steps ST746 to ST748 and ST751.

By step ST700, the drawing device 4 retrieves the map 67 from the storage device 1. In step ST746, in terms of the measurement point $P_k$, a point is drawn at $(S_k, -u_k)$ in the region 38 of the construction gauge measurement diagram 24 on the map 67. In step ST747, in terms of the measurement point $P_k$, a point is drawn at $(S_k, v_k+U_0)$ in the region 38 of the construction gauge measurement diagram 24 on the map 67. In step ST748, in terms of the measurement point Pk, a point is drawn at $(S_k, -v_k-U_0)$ in the region 38 of the construction gauge measurement diagram 24 on the map 67. In step ST751, the map on which the measurement point 10 is drawn is stored in the storage device 1 as the construction gauge measurement diagram 24. Thus, the construction gauge measurement diagram 24 drawn on the map is obtained.

According to the present embodiment, the construction gauge measurement diagram 24 obtained by superimposing the construction gauge measurement results on the map 67 can be obtained. For this reason, the measurement point 10 displayed on the construction gauge measurement diagram can be grasped along with the surrounding situations shown on the map.

It should be noted that, although the construction gauge measurement diagram 24 is drawn on the map 67 in the present embodiment described above, the construction gauge measurement diagram 24 may be drawn on the aerial photograph.

<Eighth Embodiment>

Figure 38:
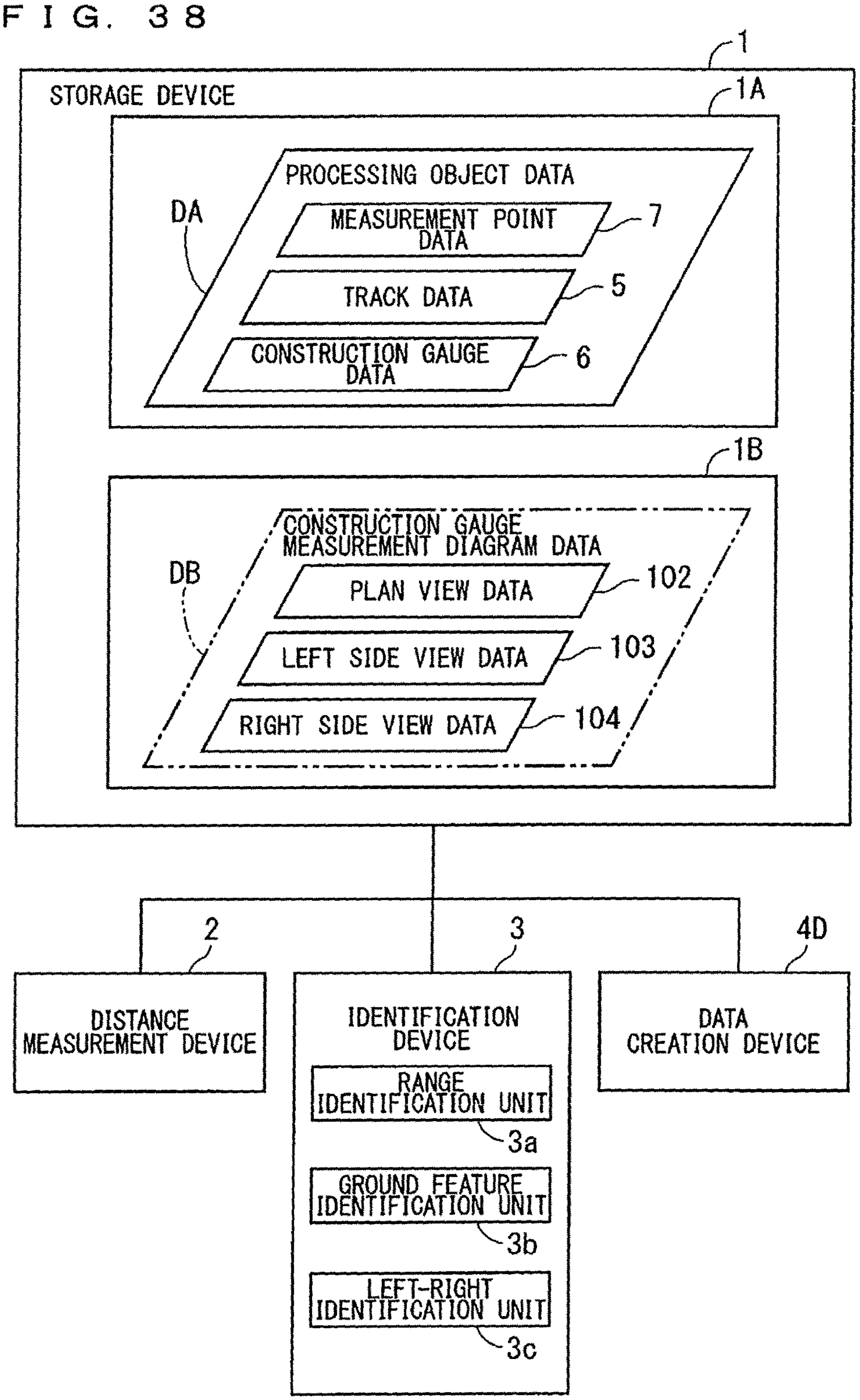
FIG. 38 is a block diagram illustrating a configuration of a device for creating construction gauge measurement diagram data according to an eighth embodiment of the present invention.

With reference to FIG. 38, in the present embodiment, construction gauge measurement diagram data DB being the data for drawing the construction gauge measurement diagram is created from processing object data DA with the above-described measurement point data 7, the track data 5, and the construction gauge data 6. The construction gauge measurement diagram data DB, which will be described in detail later, includes the data of the coordinate values for drawing each of the plurality of measurement points falling within a predetermined range from the construction gauge, and the data corresponding to the distance D from each of the measurement points to the construction gauge. 9.

(Summary)

The device for creating construction gauge measurement diagram data includes a storage device 1 (storage means), a distance measurement device 2 (distance measurement means), an identification device 3 (identification means), and a data creation device 4D (data creation means).

The storage device 1 includes a storage unit 1A capable of storing processing object data DA, and a storage unit 1B capable of storing construction gauge measurement diagram data DB. It should be noted that when the device for creating construction gauge measurement diagram data is used, first, the processing object data DA is stored in the storage unit 1A, and thereafter, the construction gauge measurement diagram data DB created based on the processing object data DA is stored in the storage unit 1B. Although in the method for creating construction gauge measurement diagram data described below, the processing object data DA is described as already stored in the storage unit 1A, the processing object data DA only need to be stored when the device is used. It should be noted that the storage units 1A and 1B may be provided as the devices independent of each other.

The data creation device 4D creates plan view data 102 including the coordinate values for drawing in the plan view the measurement point identified as the measurement point of the feature on the ground by the ground feature identification unit 3*b* among the measurement points, and the side view data including the coordinate values for drawing in at least one side view at least part of the measurement points identified as not the measurement point of the feature on the ground. In the present embodiment, left side view data 103 and right side view data 104 are created as the side view data.

In order to draw the measurement points identified to be on the ground, on the left side of the track, and on the right side of the track respectively in the plan view 18, the left side view 19, and the right side view 20 (FIG. 11), the data of each of the plan view coordinates, the left side view coordinates, and the right side view coordinates is necessary. The data creation device 4D creates the plan view data 102, the left side view data 103, and the right side view data 104 respectively corresponding to these. The data creation device 4D refers to the identification results of the measurement point 10 by the identification device 3 (FIG. 38), and obtains the coordinate values ($S_k$, $u_k$) in the plan view 18 if the measurement point 10 is a measurement point on the ground. In addition, when the measurement point 10 is not a measurement point on the ground, if the measurement point 10 is on the left side of the track, the coordinate values ($S_k$, $v_k$) of the left side view 19 is obtained, and if the measurement point 10 is on the right side of the track, the coordinate values ($S_k$, $v_k$) of the right side view 20 is obtained. As a result, the coordinate values to be stored in the construction gauge measurement diagram data DB can be obtained.

As shown in FIG. 10, the measurement point 10 of the feature on the ground is projected onto a point 25 on the horizontal projection surface 21, and the pattern projected onto this horizontal projection surface 21 is set as the plan view 18. In accordance with the left and the right, other measurement points 10 are respectively projected onto the point 26 on the left projection surface 22 or the point 27 on the right projection surface 23 along the track 12, and the patterns projected onto the left projection surface 22 and the right projection surface 23 are respectively set as the left side view 19 and the right side view 20. The data creation device 4D sets the coordinates of the measurement point 10 as the data including the coordinate values in the plan view 18, the left side view 19, or the right side view 20 where the measurement point 10 is drawn, whereby each of the plan view data 102, the left side view data 103, or the right side view data 104 is obtained.

In addition, each of the plan view data 102, the left side view data 103, and the right side view data 104 includes the data corresponding to the distance D from each of the measurement points to the construction gauge 9 in addition to the coordinate of the measurement points to be drawn. The distance D is measured by the distance measurement device 2 as described in the first embodiment.

In the drawing of the construction gauge measurement diagram using the construction gauge measurement diagram data DB, the plotting is performed in each of the plan view 18, the left side view 19, and the right side view 20 by using the coordinates included in a corresponding one of the plan view data 102, the left side view data 103, and the right side view data 104. At that time, the data, included in the construction gauge measurement diagram data DB, corresponding to the distance D from each of the measurement points to the construction gauge 9 are used, whereby the drawing process can be changed depending on the distance D. As a result, the situations of the approach or the entry to the construction gauge 9 of the measurement point 10 are represented in the construction gauge measurement diagram 24 (FIG. 11).

In order to reduce the amount of data of the construction gauge measurement diagram data DB, only the measurement points identified as falling within the predetermined range from the construction gauge 9 among the measurement points need to be used for creating the construction gauge measurement diagram data DB.

It should be noted that the configuration other than the above is about the same as the configuration in the other first embodiment described above, and therefore the same or corresponding elements will be denoted by the same reference numerals, and the description thereof will not be repeated.

(Method for Creating Construction Gauge Measurement Diagram Data)

Figure 39:
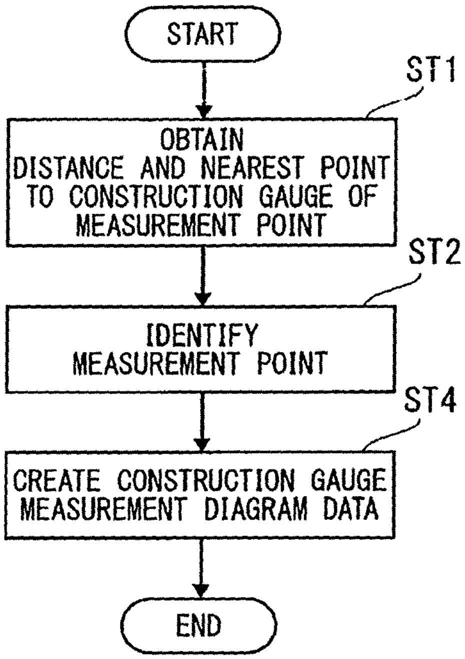
FIG. 39 is a flowchart illustrating operation of the device for creating construction gauge measurement diagram data according to the eighth embodiment of the present invention.

FIG. 39 is a flowchart of a method for creating construction gauge measurement diagram data according to the present embodiment. In step ST1, the distance measurement device 2 obtains the nearest point 16 on the construction gauge 9 and the distance to the construction gauge 9 for each measurement point 10. In step ST2, the identification device 3 performs the identification of the attributes of the measurement point 10. In step ST4, the data creation device 4D performs the data creation, and creates the construction gauge measurement diagram data DB (FIG. 38).

Figure 40:
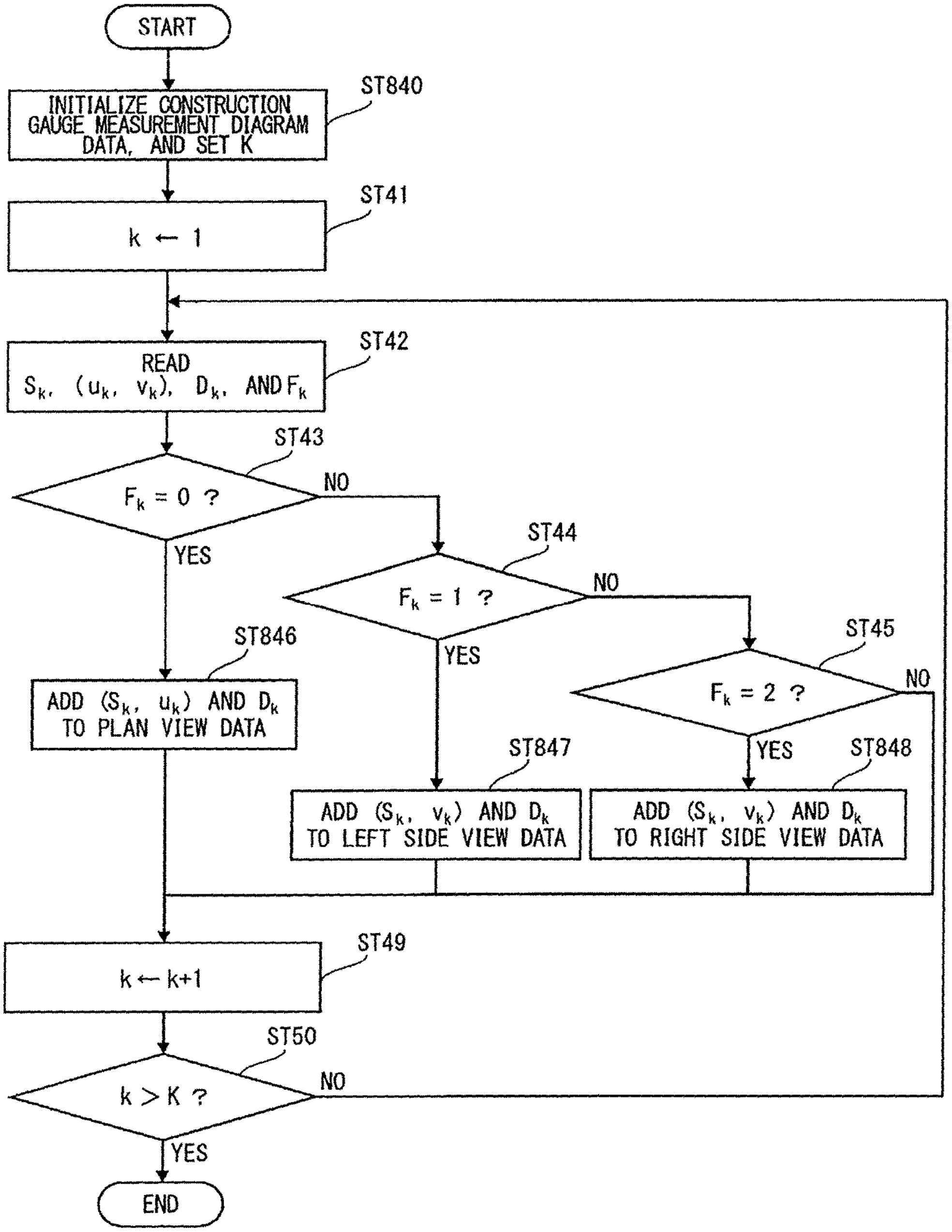
FIG. 40 is a flowchart illustrating the operation of the device for creating construction gauge measurement diagram data according to the eighth embodiment of the present invention.

With reference to FIG. 40, the operation performed by the data creation device 4D in step ST4 (FIG. 39) will be described in detail below.

In step ST840, the data creation device 4D initializes the construction gauge measurement diagram data to the state without data, and sets the variable K indicating the number of pieces of data of the measurement points. In step ST41, the variable k indicating the measurement point data is set to 1. In step ST42, the mileage $S_k$, $v_k$), the distance $D_k$, and the identification result $F_k$ of the measurement point $P_k$ are read from the storage device 1.

In step ST43, the data creation device 4D determines whether or not the k-th measurement point $P_k$ is identified as the measurement point of the feature 29 on the ground. If it is identified as the measurement point of the feature 29 on the ground, the process proceeds to step ST846, otherwise, the process proceeds to step ST44.

In step ST44, the data creation device 4D determines whether or not the k-th measurement point $P_k$ is identified to be on the left side of the track. If it is identified so, the process proceeds to step ST847, otherwise, the process proceeds to step ST45.

In step ST45, the data creation device 4D determines whether or not the k-th measurement point $P_k$ is identified to be on the right side of the track. If it is identified so, the process proceeds to step ST848, otherwise, the process proceeds to step ST49.

Figure 41:
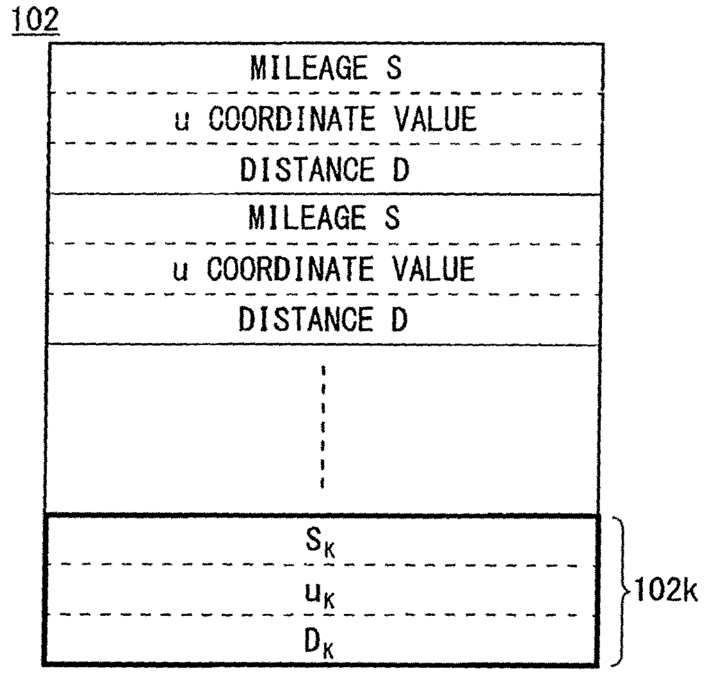
FIG. 41 is an explanatory diagram illustrating the operation of the device for creating construction gauge measurement diagram data according to the eighth embodiment of the present invention.
Figure 42:
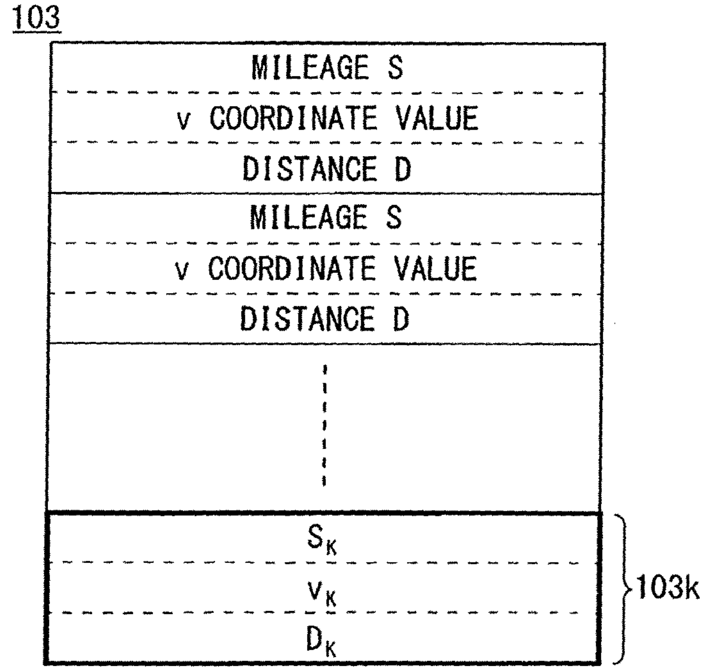
FIG. 42 is an explanatory diagram illustrating the operation of the device for creating construction gauge measurement diagram data according to the eighth embodiment of the present invention.
Figure 43:
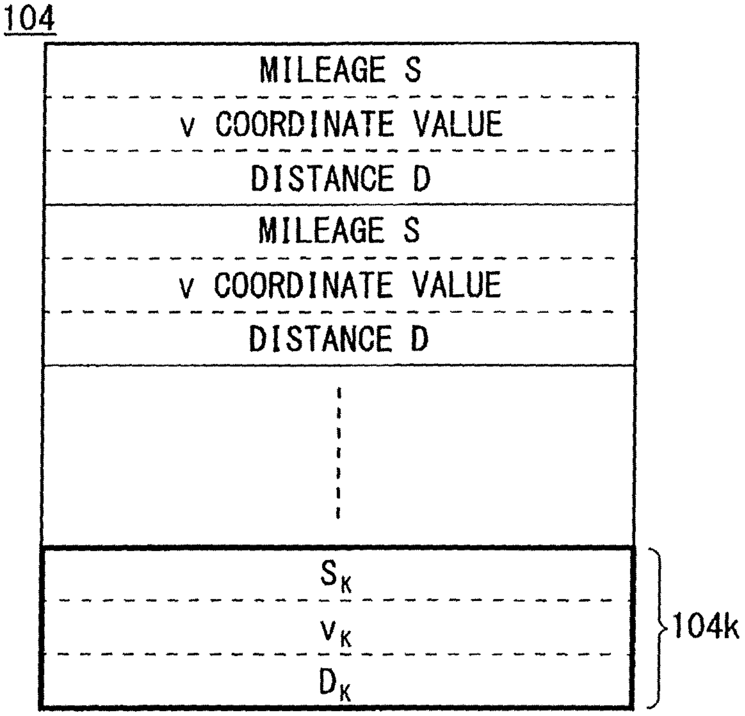
FIG. 43 is an explanatory diagram illustrating the operation of the device for creating construction gauge measurement diagram data according to the eighth embodiment of the present invention.

In step ST846, in terms of the measurement point $P_k$, the data creation device 4D sets the plan view coordinates ($S_k$, $u_k$) of the plan view 18 as the coordinate values. The coordinate values ($S_k$, $u_k$) and the distance $D_k$ are stored in the storage device 1 as one plan view element data 102*k* (FIG. 41) constituting the plan view data 102. In step ST847, in terms of the measurement point $P_k$, ($S_k$, $v_k$) of the left side view coordinates are set as the coordinate values. The coordinate values ($S_k$, $v_k$) and the distance $D_k$ are stored in the storage device 1 as one left side view element data 103*k* (FIG. 42) constituting the left side view data 103. In step ST848, in terms of the measurement point $P_k$, ($S_k$, $v_k$) of the right side view coordinates are set as the coordinate values. The coordinate values ($S_k$, $v_k$) and the distance $D_k$ are stored in the storage device 1 as one right side view element data 104*k* (FIG. 43) constituting the right side view data 104.

In step ST49, the data creation device 4D adds 1 to k. In step ST50, whether or not k is larger than K is determined. If so, then the step ST4 ends, otherwise, the process returns to step ST42. As described above, the construction gauge measurement diagram data DB can be obtained.

Next, a method for using the construction gauge measurement diagram data DB will be described. The plan view data 102, the left side view data 103, and the right side view data 104 included in the construction gauge measurement diagram data DB respectively include the coordinate data as to which position in the plan view, the left side view, and the right side view of the construction gauge measurement diagram the plotting should be performed in. As the plotting, a symbol determined by the distance D is drawn, whereby the construction gauge measurement diagram can be obtained. This is output by the output device (not shown) as the construction gauge measurement diagram.

When the measurement results of the construction gauge are submitted to the report destination, they are transmitted as the construction gauge measurement diagram data DB, whereby they can be transmitted through the communication network such as the Internet as the electronic data. When only the measurement points identified as falling within the predetermined range from the construction gauge 9 among the measurement points are used for creating the construction gauge measurement diagram data DB, the amount of the data becomes small as compared with the case where all of the measurement points are used, and therefore the submission by communication becomes easier.

In addition, when the construction gauge measurement diagram is output by using the construction gauge measurement diagram data DB, the adjustment of the output contents such as the change of the range of the mileage or the change of the symbol at the time of drawing can be easily performed. For example, the symbol at the time of drawing can al so be adapted to the report destination form in the above-mentioned report destination.

(Summary of Operations and Effects)

As described above, there can be obtained the construction gauge measurement diagram data DB capable of drawing the construction gauge measurement diagram condensedly displaying the measurement points 10 while maintaining particularly useful information for identifying on-site the position of the feature corresponding to the measurement point 10 entering or approaching the construction gauge 9. In addition, the range of the mileage or the drawing symbol in the construction gauge measurement diagram can be changed at any time by using the construction gauge measurement diagram data DB.

In the present embodiment, the data creation device 4D (FIG. 38) sets the measurement point identified as falling within the predetermined range from the construction gauge 9 by the range identification unit 3*a* among the measurement points 10 as the object of the data creation, and does not set the measurement point identified as not falling within the predetermined range from the construction gauge 9 by the range identification unit 3*a* among the measurement points 10 as the object of the data creation. As a result, the construction gauge measurement diagram capable of grasping only the measurement point approaching or entering the construction gauge 9 among the measurement points 10 can be drawn by the construction gauge measurement diagram data DB obtained by the data creation.

In addition, the data creation device 4D (FIG. 38) performs the data creation on the measurement point identified as the measurement point located on the left side by the left-right identification unit 3*c* among the measurement points 10 into the left side view element data 103*k* (FIG. 42), performs the data creation on the measurement point identified as the measurement point located on the right side by the left-right identification unit 3*c* among the measurement points 10 into the right side view element data 104*k* (FIG. 43), and integrates each of them into a corresponding one of the left side view data 103 and the right side view data 104. As a result, each of them can be separated into one of the left side view and the right side view to be drawn, and therefore it is possible to grasp which of the left side and the right side of the track the measurement point 10 of the feature not on the ground is located on.

(Modification)

Although in the above embodiment, one of the plan view element data 102*k*, the left side view element data 103*k*, and the right side view element data 104*k* is generated from one measurement point 10, a plurality of types of data among them may be generated.

In addition, although in the above embodiment, the plan view element data 102*k* is created as the data including the coordinate values of ($S_k$, $u_k$), and the side view element data of the left and right is created as the data including the coordinate values of ($S_k$, $v_k$), the coordinate values are not limited thereto, and only need to be those capable of drawing the plan view and the left and right side views based on them.

In addition, although in FIG. 38, the construction gauge measurement diagram data is shown as the data divided into the plan view data 102, the left side view data 103, and the right side view data 104, one construction gauge measurement diagram data without such divisions may be created. For example, those obtained by adding the data indicating whether to be drawn in the plan view or to be drawn in the left and right side views, such as the variable $F_k$ indicating the identification results, to the plan view coordinate values $(S_k, u_k)$ or the left and right side view coordinate values $(S_k, v_k)$ and the distance $D_k$ are set as the element data, whereby whether the element data corresponds to the plan view or corresponds to the left and right side views can be determined by the variable $F_k$.

In addition, although in the above embodiment, the plan view coordinate values $(S_k, u_k)$ or the left and right side view coordinate values $(S_k, v_k)$ and the distance $D_k$ are set as element data, and each of them constitutes the plan view data and the left and right side view data, when the symbol drawn corresponding to the distance $D_k$ is already defined, the construction gauge measurement diagram data may be formed by using the data indicating the symbol in place of the data of the distance $D_k$, or the data with the information capable of determining the symbol. It should be noted that when the drawing symbol is determined regardless of the distance $D_k$, the construction gauge measurement diagram data can also be created without including the information capable of determining the symbol such as the distance $D_k$.

In addition, although in the above embodiment, the element data of the construction gauge measurement diagram data DB are created for each of the measurement points 10, the element data may be created for each one group of the measurement points. When there are features entering or approaching the construction gauge, the measurement points entering or approaching the construction gauge can be densely obtained in accordance with the features. For this reason, these cohesive measurement points are set as one group, and the figure such as a polygon encompassing this is drawn, whereby when the construction gauge measurement diagram is drawn, the data including the coordinate values on the construction gauge measurement diagram of the figure may be used in place of the coordinates of each of the measurement points. In this case, in place of the data of the distance D of each measurement point, the minimum value, the average value of the distances D of one group of the measurement points, or the data indicating the drawing form such as the filling color of the above-mentioned figure determined by them may be used so as to represent the entering of or the approaching the construction gauge 9 of one group of measurement points.

<Note>

Although in each of the above embodiments, one measurement point is drawn only in any one of the plan view, the left side view, the right side view, and the top plan view, the same measurement point may be repeatedly drawn in a plurality of figures. For example, in the first embodiment, the measurement point of the feature 29 on the ground (FIG. 12) may be drawn not only in the plan view 18, but also in one of or both of the left side view 19 and the right side view 20 in the construction gauge measurement diagram 24 (FIG. 11).

In addition, the plan view, the side view, the top plan view, or the development view, which can be included in the construction gauge measurement diagram 24, may be drawn as separate figures, or, for example, may be drawn as a single figure as in the above seventh embodiment.

In addition, although in each of the above embodiments, the case where the track is a railway track is described, the track is not limited thereto, and for example, may be a road. In the case of the road, the track data becomes a point sequence connecting the road centerline, and the construction gauge data is given as a rectangle with a width, for example, of up to the road edge on both sides in the cross section of the road and with a predetermined height, for example, of 3.8 m being the highest limit of the height of the vehicle. As a result, the construction gauge measurement diagram representing the feature approaching or entering the roadway from the swelling portion of the roadway or the left and the right of the road can be created over a wide range of the road.

It should be noted that the present invention allows each embodiment to be freely combined and each embodiment to be appropriately modified or omitted within the scope of the invention.

Although the invention is described in detail, the foregoing description is exemplary in all aspects, and the present invention is not limited thereto. A myriad of modifications not exemplified are understood to be envisaged without departing from the scope of the invention.

REFERENCE SIGNS LIST

1: storage device (storage means)
1A: processing data storage unit
1B: construction gauge measurement diagram data storage unit
2: distance measurement device (distance measurement means)
3: identification device (identification means)
4: drawing device (drawing means)
4D: data creation device (data creation means)
5: track data
6: construction gauge data
7: measurement point data
9: construction gauge
10: measurement point
12: track
13: rail surface
16: nearest point
17: base
18: plan view
19: left side view
20: right side view
24: construction gauge measurement diagram
29: feature on ground
33: side view
35: top plan view
39: feature of upper portion
47: development view
51: measurement point of feature on ground
52: measurement point on right of track
53: measurement point on left of track
67: map
102: plan view data
102*k*: plan view element data
103: left side view data
103*k*: left side view element data
104: right side view data
104*k*: right side view element data
DA: processing object data
DB: construction gauge measurement diagram data

The invention claimed is:

1. A device for creating a construction gauge measurement diagram, the device comprising:

a memory configured to store a route of at least one track, a shape of a construction gauge defined by a plane perpendicular to the at least one track, and three-dimensional coordinates of a plurality of measurement points obtained by a mobile mapping system, which includes at least a laser scanner, that acquires a three-dimensional shape of a surrounding target space as point cloud data; and processing circuitry configured to measure a distance from each of said measurement points to said construction gauge in said route of said track;

identify each of attributes of said measurement points, by:

identifying whether or not each of said measurement points falls within a predetermined range from said construction gauge based on the distance measured, and identifying whether or not each of identified measurement points at least identified by said processing circuitry as falling within the predetermined range from said construction gauge is a measurement point of a feature on a ground among said measurement points, said feature on a ground facing on a base of said construction gauge; and draw in a plan view a measurement point identified as a measurement point of a feature on the ground by said processing circuitry among said measurement points by projecting the three-dimensional coordinate of the measurement point identified as a measurement point of a feature on the ground onto the plan view, and to draw in at least one side view at least part of measurement points identified as not a measurement point of a feature on the ground by projecting the three-dimensional coordinate of the measurement point identified as not a measurement point of a feature on the ground onto the at least one side view, said processing circuitry configured to perform different drawing processes on a measurement point identified as falling within the predetermined range from said construction gauge by said processing circuitry among said measurement points, and on a measurement point identified as not falling within the predetermined range from said construction gauge by said processing circuitry among said measurement points.

2. The device for creating a construction gauge measurement diagram according to claim 1, wherein said processing circuitry draws a measurement point identified as falling within the predetermined range from said construction gauge by said processing circuitry among said measurement points, and does not draw a measurement point identified as not falling within the predetermined range from said construction gauge by said processing circuitry among said measurement points.

3. The device for creating a construction gauge measurement diagram according to claim 1, wherein said processing circuitry draws, by using different symbols, a measurement point identified as falling within the predetermined range from said construction gauge by said processing circuitry among said measurement points, and a measurement point identified as not falling within the predetermined range from said construction gauge by said processing circuitry among said measurement points.

4. The device for creating a construction gauge measurement diagram according to claim 1, wherein said processing circuitry is further configured to identify which of a left side and a right side of said track at least part of said measurement points are located, and said processing circuitry draws a measurement point identified as a measurement point located on the left side by said processing circuitry among said measurement points in a left side view included in said at least one side view, and draws a measurement point identified as a measurement point located on the right side by said processing circuitry among said measurement points in a right side view included in said at least one side view.

5. The device for creating a construction gauge measurement diagram according to claim 4, wherein said plan view drawn by said processing circuitry takes a mileage of said route of said track as a horizontal axis, and takes a direction leftwardly perpendicular to said route of said track as an upward direction of a vertical axis, said left side view drawn by said processing circuitry takes a mileage of said route of said track as a horizontal axis, and takes a height direction as an upward direction of a vertical axis, and said right side view drawn by said processing circuitry takes a mileage of said route of said track as a horizontal axis, and takes a height direction as a downward direction of a vertical axis.

6. The device for creating a construction gauge measurement diagram according to claim 1, wherein said at least one track stored by said memory includes a route of a plurality of tracks running side by side.

7. The device for creating a construction gauge measurement diagram according to claim 1, wherein said processing circuitry is further configured to identify which of a left side and a right side of said track at least part of said measurement points are located, and said processing circuitry draws, by using different symbols, a measurement point identified as a measurement point located on the left side by said processing circuitry among said measurement points, and a measurement point identified as a measurement point located on the right side by said processing circuitry among said measurement points.

8. The device for creating a construction gauge measurement diagram according to claim 1, wherein said processing circuitry is further configured to identify whether or not each of measurement points at least identified by said processing circuitry as falling within the predetermined range from said construction gauge is a feature of an upper portion among said measurement points, and said processing circuitry draws in a top plan view a measurement point identified as a measurement point of a feature of an upper portion by said processing circuitry among said measurement points.

9. The device for creating a construction gauge measurement diagram according to claim 1, wherein said memory stores a map of a region including a route of said at least one track, and said processing circuitry draws a construction gauge measurement diagram on said map.

10. The device for creating a construction gauge measurement diagram according to claim 1, wherein said processing circuitry identifies, among said measurement points, a measurement point where a nearest point to said construction gauge is on a base of said construction gauge as a measurement point of a feature on the ground.

11. The device for creating a construction gauge measurement diagram according to claim 1, wherein said processing circuitry identifies, among said measurement points, a measurement point where a height from a surface on which a wheel of a vehicle passing said track rolls is a predetermined value or less as a measurement point of a feature on the ground.

12. A device for creating construction gauge measurement diagram data, the device comprising:

a memory configured to store a route of at least one track, a shape of a construction gauge defined by a plane perpendicular to the at least one track, and three-dimensional coordinates of a plurality of measurement points obtained by a mobile mapping system, which includes at least a laser scanner, that acquires a three-dimensional shape of a surrounding target space as point cloud data; and processing circuitry configured to measure a distance from each of said measurement points to said construction gauge in said route of said track;

identify each of attributes of said measurement points, by:

identifying whether or not each of said measurement points falls within a predetermined range from said construction gauge based on the distance measured, and identifying whether or not each of identified measurement points at least identified by said processing circuitry as falling within the predetermined range from said construction gauge is a measurement point of a feature on a ground among said measurement points, said feature on a ground facing on a base of said construction gauge; and create plan view data including coordinate values for drawing in a plan view a measurement point identified as a measurement point of a feature on the ground by said processing circuitry among said measurement points by projecting the three-dimensional coordinate of the measurement point identified as a measurement point of a feature on the ground onto the plan view, and side view data including coordinate values for drawing in at least one side view at least part of measurement points identified as not the measurement point of a feature on the ground by projecting the three-dimensional coordinate of the measurement point identified as not a measurement point of a feature on the ground onto the at least one side view.

13. A method implemented by a device for creating a construction gauge measurement diagram based on a route of at least one track, a shape of a construction gauge defined by a plane perpendicular to the at least one track, and coordinates of a plurality of measurement points obtained by a mobile mapping system, which includes at least a laser scanner, that acquires a three-dimensional shape of a surrounding target space as point cloud data, the method comprising:

by processing circuitry of the device, a step of measuring a distance from each of said measurement points to said construction gauge in said route of said track;

a step of identifying each of attributes of said measurement points, said step of identifying the attributes including:

a step of identifying whether or not each of said measurement points falls within a predetermined range from said construction gauge based on said measured distance, and a step of identifying whether or not each of measurement points at least identified by said range identification unit as falling within the predetermined range from said construction gauge is a measurement point of a feature on a ground among said measurement points, said feature on a ground facing on a base of said construction gauge; and the method further comprising a step of drawing, in a plan view, a measurement point identified by said ground feature identification unit as a measurement point of a feature on the ground among said measurement points by projecting the three-dimensional coordinate of the measurement point identified as a measurement point of a feature on the ground onto the plan view, and drawing, in at least one side view, at least part of measurement points identified by said ground feature identification unit as not a measurement point of a feature on the ground by projecting the three-dimensional coordinate of the measurement point identified as not a measurement point of a feature on the ground onto the at least one side view, wherein said processing circuitry performs different drawing processes on a measurement point identified by said processing circuitry as falling within the predetermined range from said construction gauge among said measurement points, and on a measurement point identified by said processing circuitry as not falling within the predetermined range from said construction gauge among said measurement points.

* * * * *